United States Patent
Seo et al.

(10) Patent No.: US 10,906,127 B2
(45) Date of Patent: Feb. 2, 2021

(54) FRICTION STIR WELDING METHOD

(71) Applicant: NIPPON LIGHT METAL COMPANY, LTD., Tokyo (JP)

(72) Inventors: Nobushiro Seo, Shizuoka (JP); Hisashi Hori, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/114,294

(22) PCT Filed: Dec. 16, 2014

(86) PCT No.: PCT/JP2014/083286
§ 371 (c)(1),
(2) Date: Jul. 26, 2016

(87) PCT Pub. No.: WO2015/114975
PCT Pub. Date: Aug. 6, 2015

(65) Prior Publication Data
US 2017/0001257 A1    Jan. 5, 2017

(30) Foreign Application Priority Data

Jan. 28, 2014 (JP) .................. 2014-013543
May 28, 2014 (JP) .................. 2014-109663
May 28, 2014 (JP) .................. 2014-109899

(51) Int. Cl.
*B23K 20/12*    (2006.01)
*B23K 9/04*    (2006.01)

(52) U.S. Cl.
CPC .............. *B23K 20/125* (2013.01); *B23K 9/04* (2013.01); *B23K 20/1215* (2013.01); *B23K 20/1265* (2013.01)

(58) Field of Classification Search
CPC . B23K 20/122; B23K 20/1225; B23K 20/123
(Continued)

(56) References Cited

U.S. PATENT DOCUMENTS 5,971,247 A    10/1999  Gentry
6,045,028 A *  4/2000  Martin ................ B23K 20/122
                                                228/112.1
(Continued)

FOREIGN PATENT DOCUMENTS

JP    2001-321965 A    11/2001
JP    2003-001440 A     1/2003
(Continued)

OTHER PUBLICATIONS

JP-2004141897-A computer english translation (Year: 2004).*
(Continued)

*Primary Examiner* — Erin B Saad
(74) *Attorney, Agent, or Firm* — Merchant & Gould P.C.

(57) ABSTRACT

A friction stir welding method is provided that can prevent defective welding due to a shortage of metal. The friction stir welding method welds metal members (1, 2) using a primary joining rotary tool (F) having a stirring pin (F2), and includes steps of: butting in which the metal members (1, 2) are butted with each other at an angle to form a butted portion (J1); buildup welding in which buildup welding is applied along an inner corner of the metal members (1, 2) formed in the butting step to cover the inner corner by a weld metal (M); and inner corner joining in which only the stirring pin (F2) in rotation is inserted in the inner corner to plastically fluidize the weld metal (M) and the metal members (1, 2) for friction stir welding of the butted portion (J1).

30 Claims, 29 Drawing Sheets

(58) Field of Classification Search
USPC .............................. 228/112.1, 113, 114, 2.1
See application file for complete search history.

(56) References Cited

U.S. PATENT DOCUMENTS

| | | | | |
|---|---|---|---|---|
| 2002/0145031 | A1* | 10/2002 | Hirano | B23K 20/123 228/112.1 |
| 2003/0024965 | A1 | 2/2003 | Okamura et al. | |
| 2004/0074949 | A1* | 4/2004 | Narita | B21D 51/26 228/112.1 |
| 2007/0119906 | A1* | 5/2007 | Mika | B23K 20/1245 228/112.1 |
| 2010/0096438 | A1* | 4/2010 | Sato | B23K 20/1225 228/114 |
| 2012/0193401 | A1* | 8/2012 | Hori | B23K 20/1265 228/112.1 |
| 2014/0166731 | A1 | 6/2014 | Seo et al. | |

FOREIGN PATENT DOCUMENTS

| | | | |
|---|---|---|---|
| JP | 2003001440 | A * | 1/2003 |
| JP | 2004141897 | A * | 5/2004 |
| JP | 2008-284607 | A | 11/2008 |
| JP | 2009-136881 | A | 6/2009 |
| JP | 2013-49072 | A | 3/2013 |
| WO | 2013/027532 | A1 | 2/2013 |

OTHER PUBLICATIONS

JP-2003001440-A computer english translation (Year: 2003).*
International Search Report for PCT/JP2014/083286, dated Mar. 24, 2015.
Communication pursuant to Article 94(3) for European Patent Application No. 14880652.4, dated Nov. 26, 2020.

* cited by examiner

FRICTION STIR WELDING METHOD

CROSS-REFERENCE TO RELATED APPLICATION

This application is a U.S. National Stage Application under 35 U.S.C. § 371 of International Patent Application No. PCT/JP2014/083286, filed Dec. 16, 2014, which claims benefit of Serial No. No. 2014-013543, filed Jan. 28, 2014 in Japan, Serial No. 2014-109663, filed May 28, 2014 in Japan and Serial No. 2014-109899, filed May 28, 2014 in Japan, and which applications are incorporated herein by reference in their entireties. To the extent appropriate, a claim of priority is made to each of the above disclosed applications.

TECHNICAL FIELD

The present invention relates to a friction stir welding method.

BACKGROUND ART

Patent Document 1 discloses a technique in which only a stirring pin of a rotary tool is inserted in an inner corner formed by metal members which are butted perpendicularly to each other to carry out friction stir welding along the butted portion. The rotary tool used in the conventional friction stir welding method does not have a shoulder and only the stirring pin of the rotary tool is inserted in the inner corner, allowing for carrying out friction stir welding to a deeper position of the butted portion.

PRIOR ART DOCUMENTS

Patent Documents

Patent Document 1: Japanese Patent Application Publication No. 2013-049072

SUMMARY OF THE INVENTION

Problems to be Solved by the Invention

However, in the conventional friction stir welding method, plastic fluidized metal is not retained by a shoulder, to cause the plastic fluidized metal to be overflowed outside the inner corner. Accordingly, the inner corner may suffer a shortage of metal.

To solve such a problem, the present invention provides a friction stir welding method that can solve, when a butted portion is applied with friction stir welding along an inner corner formed by metal members, a shortage of metal in the inner corner.

Means to Solve the Problems

To solve the problems above, the present invention provides a friction stir welding method for joining two metal members by a rotary tool having a stirring pin, including steps of: butting in which the metal members are butted with each other at an angle to form a butted portion; buildup welding in which buildup welding is applied along an inner corner of the metal members formed in the butting step to cover the inner corner by a weld metal; and inner corner joining in which only the stirring pin in rotation is inserted in the weld metal and the inner corner to plastically fluidize the weld metal and the metal members for friction stir welding of the butted portion.

The present invention provides a friction stir welding method for joining two metal members by a rotary tool having a stirring pin, including steps of: butting in which the metal members are butted with each other at an angle to form a butted portion; auxiliary member arranging in which an auxiliary member is arranged on an inner corner of the metal members formed in the butting step; and inner corner joining in which only the stirring pin in rotation is inserted in the auxiliary member and the inner corner to plastically fluidize the auxiliary member and the metal members for friction stir welding of the butted portion.

According to the welding methods, the inner corner of the metal members is applied with welding in advance to form a weld metal, or the inner corner joining step is applied in a state where the auxiliary member is provided, which can solve a shortage of metal to prevent a joining defect due to the shortage of metal. In a case where the buildup welding step is applied, a gap between the metal members at the time of inner corner joining step can be prevented.

A step of outer corner joining is preferably included in which the butted portion is applied with friction stir welding along an outer corner of the metal members.

According to the welding method, joining strength of the butted portion can be improved.

A plasticized region formed in the outer corner joining step is preferably overlapped with a plasticized region formed in the inner corner joining step.

According to the welding method, the entire butted portion in a depth direction is frictionally stirred, to enhance joining strength in addition to air tightness and water tightness.

A step of outer corner joining is preferably included in which the butted portion is applied with welding along an outer corner of the metal members.

According to the welding method, joining strength of the butted portion can be improved.

A weld metal formed in the outer corner welding step is preferably overlapped with a plasticized region formed in the inner corner welding step.

According to the welding method, the entire butted portion in the depth direction is joined, to enhance joining strength in addition to air tightness and water tightness.

In the butting step, a side face of one of the metal members is butted with an end face of the other metal member to form an inner corner having an angle $\alpha$ by the side face of one of the metal members and a side face of the other of the metal members, in the inner corner welding step, a rotation center axis of the rotary tool inserted through an intersection line of the side faces is preferably positioned between the side face of one of the metal members and an imaginary reference plane that runs through the intersection line and has an angle of $\alpha/2$ with respect to the side faces.

According to the welding method, the rotary tool is inclined toward one metal member, allowing for inserting the stirring pin into a deeper position of the butted portion to join the butted portion to the deeper position.

The present invention provides a friction stir welding method for joining two metal members having faces to be butted in different shapes from each other by a rotary tool having a stirring pin, including steps of: butting in which one metal member is butted with the other metal member to form a butted portion; buildup welding in which the butted portion is applied with buildup welding along a circumferential direction of the other metal member to cover an inner corner of the metal members by a weld metal; and joining in which the stirring pin in rotation is inserted in the inner corner to carry out friction stirring in the butted portion along the circumferential direction of the other metal member in a state where only the stirring pin is brought in contact with the weld metal and the metal members.

The present invention provides a friction stir welding method for joining two metal members having faces in different shapes to be butted by a rotary tool having a stirring pin, including steps of: butting in which one metal member is butted with the other metal member to form a butted portion; auxiliary member arranging in which an auxiliary member is arranged on the butted portion along a circumferential direction of the other metal member to cover an inner corner of the metal members by the auxiliary member; and joining in which the stirring pin in rotation is inserted in the inner corner to carry out friction stirring in the butted portion along the circumferential direction of the other metal member in a state where only the stirring pin is brought in contact with the auxiliary member and the metal members.

According to the friction stir welding methods, the inner corner formed by butting the metal members is applied with buildup welding in advance, or is applied with friction stirring after the auxiliary member is arranged, to solve a shortage of metal in the inner corner.

Preferably, the metal members have a plate shape, and an upper face of one of the metal members is butted with a lower face of the other of the metal members in the butting step.

Preferably, one of the metal members has a plate shape and the other of the metal members has a columnar shape, and an upper face of one of the metal members is butted with an end face of the other of the metal members in the butting step.

Preferably, one of the metal members has a plate shape and the other of the metal members has a tubular shape, and an upper face of one of the metal members is butted with an end face of the other of the metal members in the butting step.

Preferably, one of the metal members has a plate shape and the other of the metal members has a cylindrical shape, and an upper face of one of the metal members is butted with an end face of the other of the metal members in the butting step.

Preferably, one of the metal members is formed with a through hole, and the other of the metal members covers the through hole or the through hole is made to communicate with a hollow portion of the other of the metal members in the butting step.

According to the friction stir welding methods, metal members having various shapes can be welded.

The present invention provides a friction stir welding method for joining two metal members by a rotary tool having a stirring pin, including steps of: butting in which a side face of one of the metal members is butted with an end face of the other of the metal members to form a butted portion for forming a joined metal member having a T-shape in front view; buildup welding in which at least one inner corner of the joined metal member is applied with buildup welding to cover the inner corner by a weld metal; and joining in which the stirring pin in rotation is inserted in the inner corner to carry out friction stirring in the butted portion in a state where only the stirring pin is brought in contact with the weld metal and the joined metal members.

According to the friction stir welding method, the inner corner formed by butting the metal members is applied with buildup welding in advance, and then, is applied with friction stirring to solve a shortage of metal in the inner corner.

Preferably, two inner corners of the joined metal member are applied with buildup welding to cover each inner corner by a weld metal in the buildup welding step, and the joining step includes steps of first joining in which one of the two inner corners of the joined metal member is applied with friction stirring and second joining in which the other of the inner corners is applied with friction stirring, wherein, in the second joining step, friction stirring is carried out while the stirring pin is inserted into a plasticized region formed in the first joining step.

According to the friction stir welding method, the buildup welding step can improve joining strength of the metal members, allowing for a stable joining step. In addition, the two inner corners are applied with friction stirring to improve joining strength in addition to air tightness and water tightness of the joined portion. Further, the other joining step is carried out in a state that the stirring pin is inserted into one of the plasticized region to further improve air tightness and water tightness.

The present invention provides a friction stir welding method for joining two metal members by a rotary tool having a stirring pin, comprising steps of: butting in which a side face of one of the metal members is butted with an end face of the other of the metal members to form a butted portion for forming a joined metal member having a T-shape in front view; auxiliary member arranging in which an auxiliary member is arranged on at least one inner corner of the joined metal member to cover the inner corner by the auxiliary member; and joining in which the stirring pin in rotation is inserted in the inner corner to carry out friction stirring in the butted portion in a state where only the stirring pin is brought in contact with the auxiliary member and the joined metal member.

According to the friction stir welding method, the auxiliary member is arranged along the inner corner formed by butting the metal members in advance, and then, is applied with friction stirring to solve a shortage of metal in the inner corner.

Preferably, in the auxiliary member arrange step, two inner corners of the joined metal member are arranged with the auxiliary members respectively to cover each inner corner by the auxiliary member, and the joining step includes steps of first joining in which one of the two inner corners of the joined metal member is applied with friction stirring and second joining in which the other of the inner corners is applied with friction stirring, wherein, in the second joining step, friction stirring is carried out while the stirring pin is inserted into a plasticized region formed in the first joining step.

According to the friction stir welding method, the two inner corners are applied with friction stirring to improve joining strength in addition to air tightness and water tightness of the joined portion. Further, the other joining step is carried out in a state that the stirring pin is inserted into one of the plasticized region, to further improve air tightness and water tightness.

Preferably, a tab member arranging step is included in which a tab member having two tool insertion faces is abutted on a front face of the joined metal member after the butting step, wherein an exposed face of one of the auxiliary members is made flush with one of the tool insertion face of the tab member, and an exposed face of the other of the auxiliary members is made flush with the other of the tool insertion face of the tab member.

According to the friction stir welding method, the insertion position of the rotary tool in the joining step can be set on the tab member. Also, the exposed face of each auxiliary member is made flush with the two tool insertion faces of the tab member respectively, allowing for smooth friction stirring. In addition, the insertion positions for the two joining steps can be set on one tab member, resulting in higher operating efficiency.

Effect of the Invention

The friction stir welding method according to the present invention can solve the shortage of metal in the inner corner when the butted portion is applied with friction stir welding along the inner corner of the metal members.

EMBODIMENTS OF THE INVENTION

Embodiments of the present invention will be described in detail with reference to the drawings. First, a primary joining rotary tool, a large rotary tool and a small rotary tool used in the embodiments will be described.

Figure 1A:
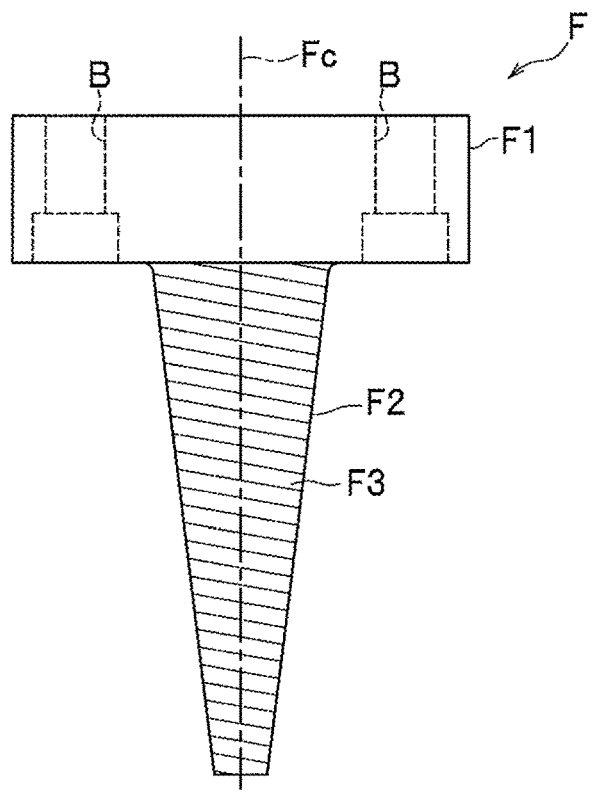
FIG. 1A is a side view showing a primary joining rotary tool.

As shown in FIG. 1A, a primary joining rotary tool F is made up of a coupling portion F1 and a stirring pin F2. The primary joining rotary tool F is formed, for example, of tool steel. The coupling portion F1 is coupled to a rotary shaft D of a friction stirring apparatus shown in FIG. 1B. The coupling portion F1 has a columnar shape and includes bolt holes B, B formed therein, into which bolts are fastened.

The stirring pin F2 extends downward from the coupling portion F1 and is coaxial therewith. The stirring pin F2 tapers off with the increasing distance from the coupling portion F1. A spiral groove F3 is formed on the outer circumferential face of the stirring pin F2.

In the present embodiment, since the primary joining rotary tool F is rotated clockwise, the spiral groove F3 is formed counterclockwise from the base end toward the tip end. In other words, the spiral groove F3 can be traced from the base end toward the tip end to find that it is formed counterclockwise as seen from above.

It should be noted that, in a case where the primary joining rotary tool F is rotated counterclockwise, the spiral groove F3 is preferably formed clockwise from the base end toward the tip end. In other words, the spiral groove F3 in this case can be traced from the base end to the tip end to find that it is formed clockwise as seen from above. The spiral groove F3 formed in this way allows plastic fluidized metal to be led toward the tip end of the stirring pin F2 via the spiral groove F3 during friction stirring. This reduces the amount of metal overflowed out of joined metal members.

Figure 1B:
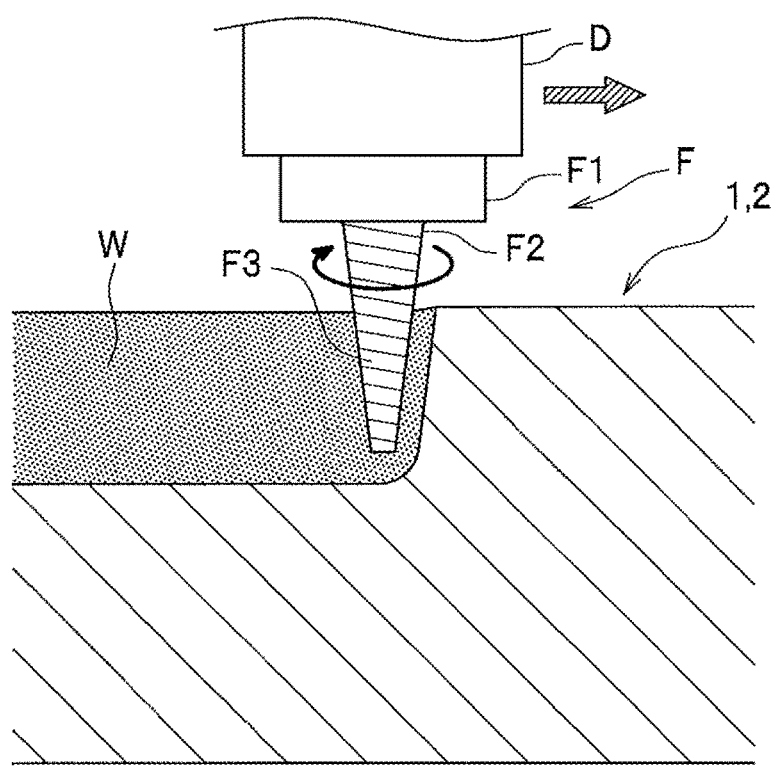
FIG. 1B is a cross-sectional view of welding by the primary joining rotary tool of the present embodiment.

As shown in FIG. 1B, when friction stir welding is carried out by the primary joining rotary tool F, the primary joining rotary tool F is moved in such a manner that only the stirring pin F2 in rotation is inserted into the metal members 1, 2 and the coupling portion F1 is kept away from the metal members 1, 2. In other words, friction stir welding is made while the base end of the stirring pin F2 is exposed. Along the movement path of the primary joining rotary tool F, a plasticized region W is formed by the frictionally stirred metal hardening.

Though a specific drawing is omitted, when a joining step to be described later is carried out, for example, the primary joining rotary tool F may be attached to a robot arm having a rotary drive unit, such as a spindle unit, at the top for friction stirring. Such a friction stirring apparatus facilitates changing such as insertion positions and insertion angles of the primary joining rotary tool F.

Figure 2A:
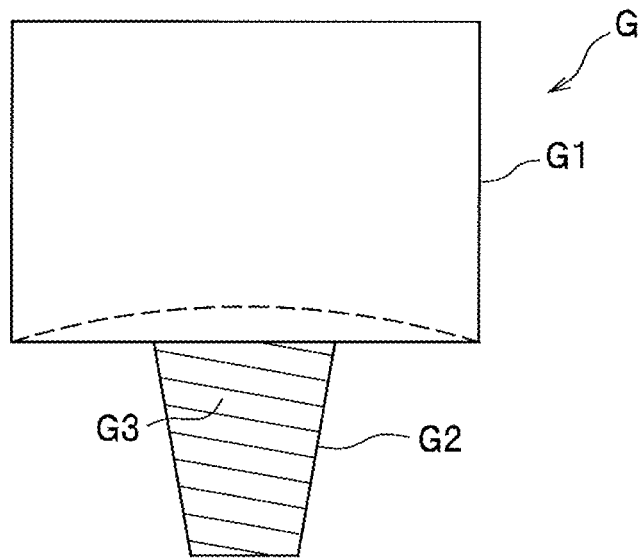
FIG. 2A is a side view showing a large rotary tool.

As shown in FIG. 2A, the large rotary tool G is made up of a shoulder G1 and a stirring pin G2. The large rotary tool G is formed, for example, of tool steel. The shoulder G1 is coupled to the rotary shaft of the friction stirring apparatus and is used for retaining the plastic fluidized metal. The shoulder G1 has a columnar shape. The lower end face of the shoulder G1 has a concave shape to prevent the fluidized metal from flowing outside.

The stirring pin G2 extends downward from the shoulder G1 and is coaxial therewith. The stirring pin G2 tapers off with the increasing distance from the shoulder G1. The stirring pin G2 has a spiral groove G3 formed on the outer circumferential face thereof. When friction stir welding is carried out by the large rotary tool G, the stirring pin G2 in rotation and the lower end face of the shoulder G1 are inserted into the metal members 1, 2 so as to be moved relatively.

Figure 2B:
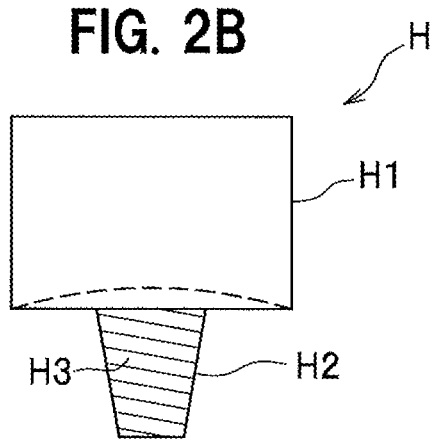
FIG. 2B is a side view showing a small rotary tool of the present embodiment.

As shown in FIG. 2B, the small rotary tool H is made up of a shoulder H1 and a stirring pin H2. The small rotary tool H is smaller in size than the primary joining rotary tool F and the large rotary tool G. The small rotary tool H is, for example, made of tool steel. The shoulder H1 is coupled to the rotary shaft of the friction stirring apparatus and is used for retaining the plastic fluidized metal. The shoulder H1 has a columnar shape. The lower end face of the shoulder H1 has a concave shape to prevent the fluidized metal from flowing outside.

The stirring pin H2 extends downward from the shoulder H1 and is coaxial therewith. The stirring pin H2 tapers off with the increasing distance from the shoulder H1. The stirring pin H2 has a spiral groove H3 formed on the outer circumferential face thereof. When friction stir welding is carried out by the small rotary tool H, the stirring pin H2 in rotation and the lower end face of the shoulder H1 are inserted into the metal members 1, 2 so as to be moved relatively.

First Embodiment

Next, a description will be given of a friction stir welding method according to a first embodiment of the present invention. The first embodiment includes: a butting step, a tab member arranging step, an outer corner joining step, a buildup welding step and an inner corner joining step.

Figure 3A:
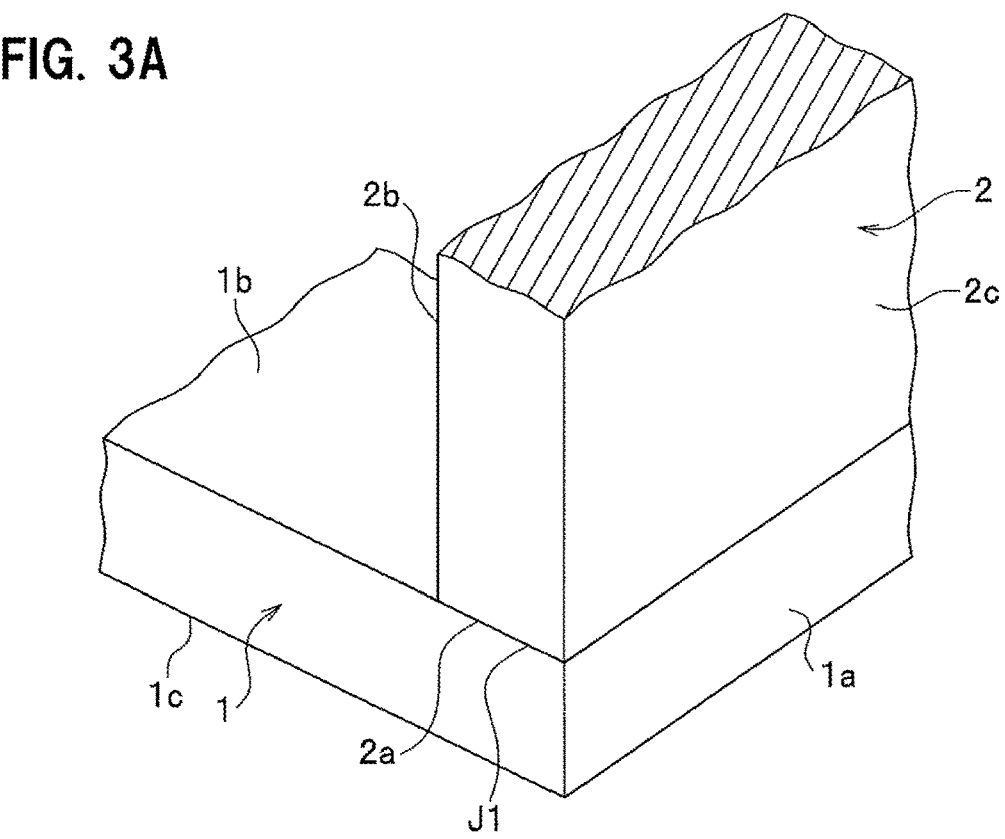
FIG. 3A is a perspective view showing a butting step.

As shown in FIG. 3A, the metal members 1, 2 are butted to each other in the butting step. In the butting step, a side face 1b of the metal member 1 is butted with an end face 2a of the metal member 2 to be joined such that an end face 1a of the metal member 1 is flush with a side face 2c of the metal member 2. That is, in the butting step, the metal members 1, 2 are butted perpendicularly to have an L-shape in side view. A butted portion J1 is formed at a portion where the metal members 1, 2 are butted. The metal members 1, 2 are not especially limited as long as they are metal to be frictionally stirrable, and may be suitably selected from aluminum, aluminum alloy, copper, copper alloy, titanium, titanium alloy, magnesium, magnesium alloy or the like.

Figure 3B:
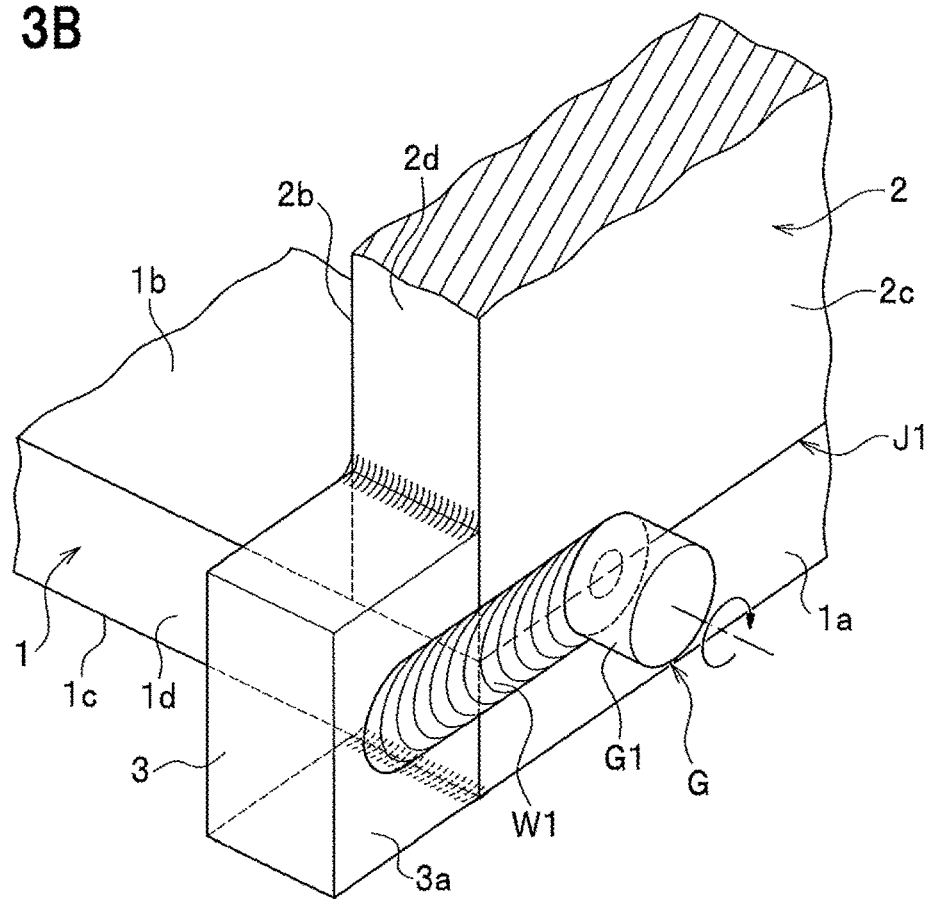
FIG. 3B is a perspective view showing an outer corner joining step according to a first embodiment.

As shown in FIG. 3B, a tab member 3 is arranged to the metal members 1, 2 in the tab member arranging step. The tab member 3 has a rectangular parallelepiped shape and is formed with the same material as the metal members 1, 2. In the tab member arranging step, the tab member 3 is arranged to one end of the butted portion J1 of the metal members 1, 2 to make the side face of the tab member 3 abut on a side face 1d of the metal member 1 and a side face 2d of the metal member 2. A face 3a of the tab member 3 is made flush with an end face 1a of the metal member 1 and a side face 2c of the metal member 2 so that they are provisionally joined with each other by welding.

After the tab member arranging step, the metal members 1, 2 and the tab member 3 are placed on a mount of the friction stirring apparatus (not shown) so as to be fixed immovably by a jig such as a clamp (not shown).

The butted portion J1 of the metal members 1, 2 is applied with friction stir welding along the outer corner of the metal members 1, 2 in the outer corner joining step. The large rotary tool G is used in the outer corner joining step. As shown in FIG. 3B, in the outer corner joining step, the large rotary tool G is inserted into the face 3a of the tab member 3 so as to be relatively moved toward the metal members 1, 2 for proceeding to the butted portion J1 continuously, so that the butted portion J1 is applied with friction stir welding along the outer corner (along the face constituting the outer corner) of the metal members 1, 2.

In the outer corner joining step, the large rotary tool G is relatively moved in a condition where the lower end face of the shoulder G1 is pressed on the metal members 1, 2. Along the movement path of the large rotary tool G, a plasticized region W1 is formed. After the butted portion J1 is joined, the tab member 3 is cut off from the metal members 1, 2.

Figure 4:
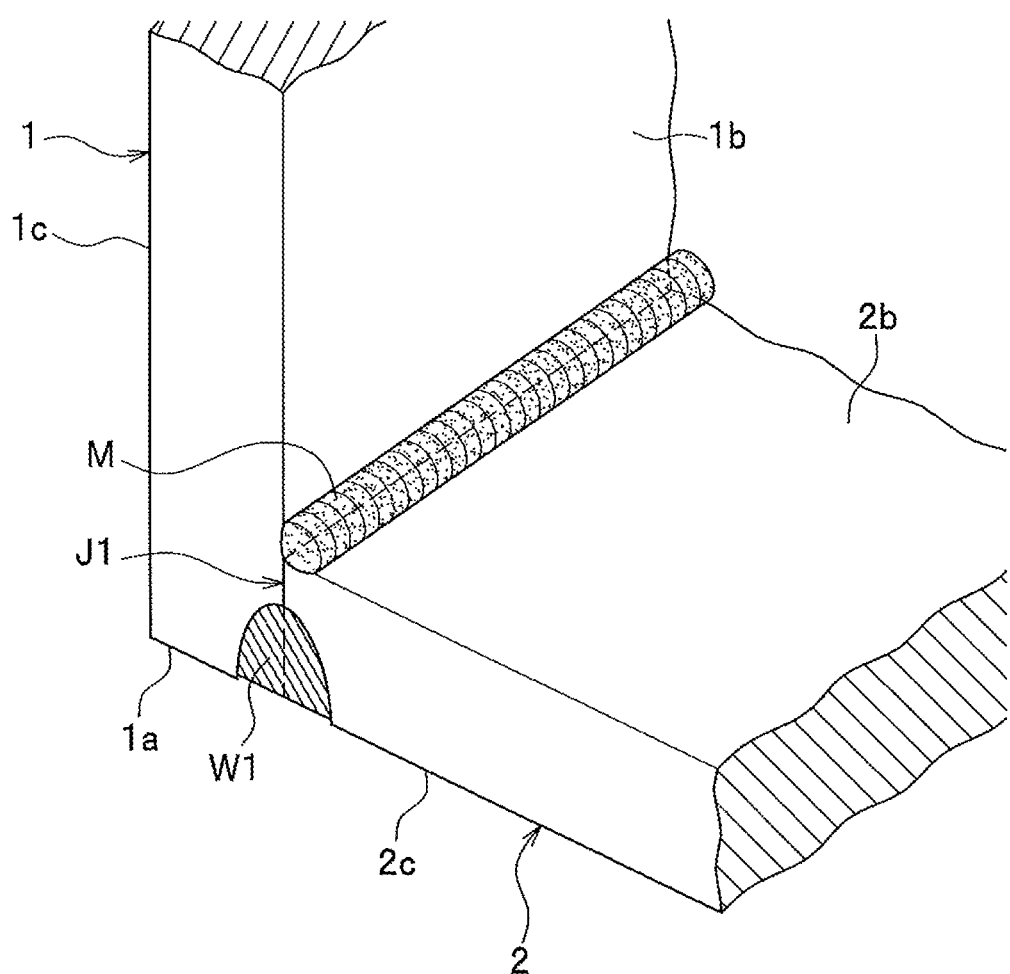
FIG. 4 is a perspective view showing a buildup welding step according to the first embodiment.

As shown in FIG. 4, the inner corner of the metal members 1, 2 is applied with buildup welding in the buildup welding step. In the buildup welding step, the inner corner (corner formed by the side face 1b and the side face 2b) of the metal members 1, 2 is applied with buildup welding to cover the butted portion J1. A weld metal M is formed along the butted portion J in the buildup welding step. In the present embodiment, the weld metal M is formed of the same material as that of the metal members 1, 2.

Figure 5A:
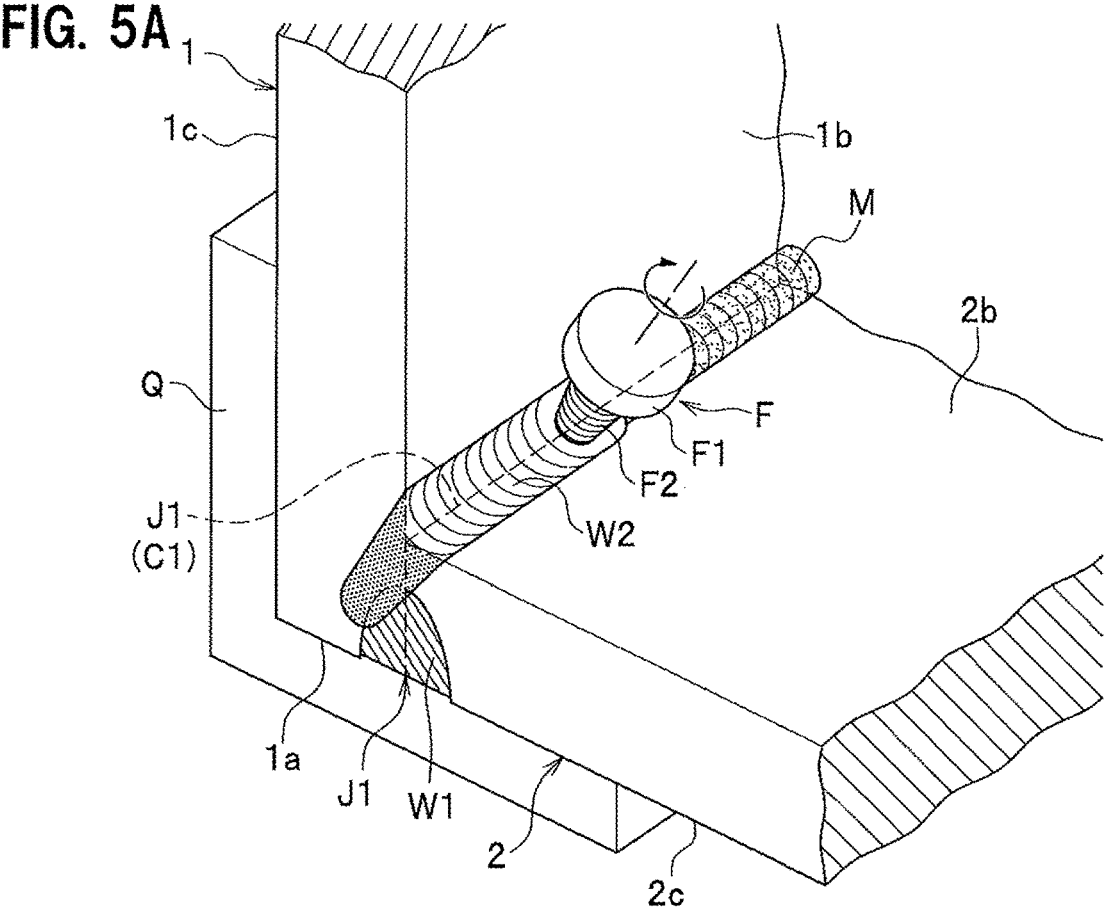
FIG. 5A is a perspective view and FIG. 5B is a cross-sectional view showing an inner corner joining step in the first embodiment.
Figure 5B:
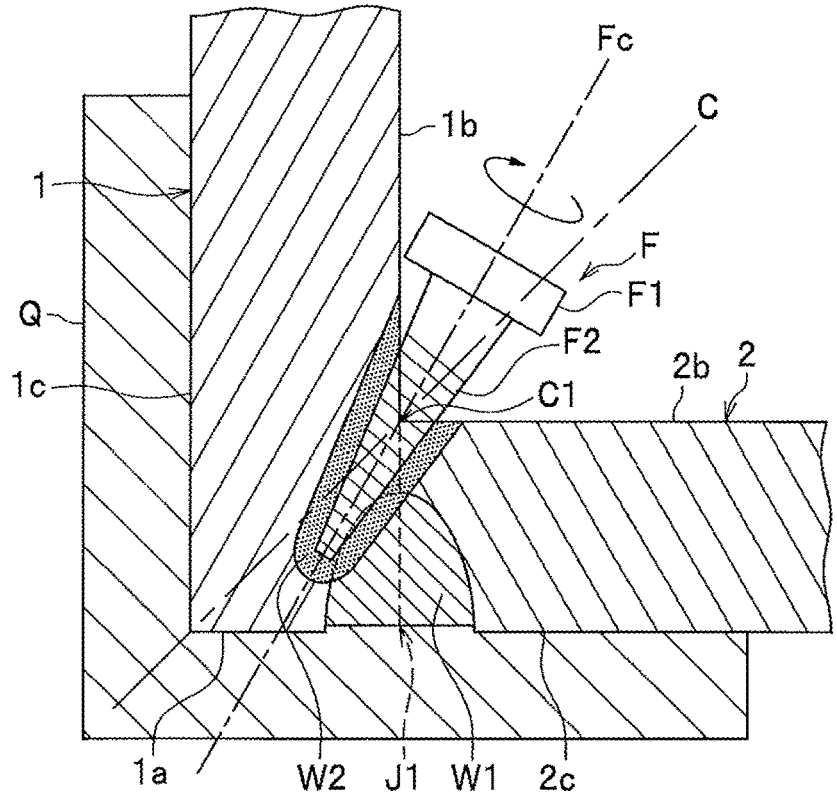

As shown in FIGS. 5A and 5B, the inner corner of the metal members 1, 2 is joined by the primary joining rotary tool F in the inner corner joining step. In the inner corner joining step according to the present embodiment, at first, as shown in FIG. 5A, a backing member Q is arranged on the faces forming the outer corner of the metal members 1, 2.

The backing member Q is a metal member having an L-shape in a cross section to come in contact with the side face 1c and the end face 1a of the metal member 1, and the side face 2c of the metal member 2. Then, the metal members 1, 2 and the backing member Q are placed on the mount of the friction stirring apparatus (not shown) so as to be immovably fixed by the jig such as a clamp (not shown).

Next, in the inner corner joining step, the primary joining rotary tool F in rotation is inserted into the inner corner of the metal members 1, 2 to carry out friction stir welding to the butted portion J1. In the inner corner joining step, as shown in FIGS. 5A and 5B, the coupling portion F1 of the primary joining rotary tool F is separated from the metal members 1, 2 to insert only the stirring pin F2 into the butted portion J1 via the weld metal M. Along the movement path of the primary joining rotary tool F, a plasticized region W2 is formed.

In the inner corner joining step, an insertion angle of the primary joining rotary tool F may be set properly, and, as shown in FIG. 5B, in the present embodiment, a rotation center axis Fc of the primary joining rotary tool F is preferably inclined toward the metal member 1 to carry out friction stir welding. That is, in the inner corner joining step of the present embodiment, the rotation center axis Fc of the primary joining rotary tool F inserting through an intersection line C1 between the side faces 1b, 2b is set to be positioned between the side face 1b of the metal member 1 and an imaginary reference plane C that runs through the intersection line C1 and has an angle of $\alpha/2$ ($\alpha=90$ degrees in the present embodiment) with respect to the side faces 1b, 2b. Further, in the inner corner joining step, the plasticized region W2 formed in the inner corner joining step is set to be overlapped with the plasticized region W1 formed in the outer corner joining step at the butted portion J1. It should be noted that, in this case, the position of the rotation center axis Fc excludes a position on a plain overlapping with the side face 1b or the imaginary reference plane C.

According to the friction stir welding method of the present embodiment described above, in the inner corner joining step to join the inner corner of the metal members 1, 2, only the stirring pin F2 is made to contact with the metal members 1, 2 without a retaining block as in a prior art, to prevent damage on the side face 1b of the metal member 1 and the side face 2b of the metal member 2 when they are joined. In addition, the retaining block is not used as in a prior art, allowing an operator to see the joined portion. This can enhance workability because a welded condition and the like can be seen.

Further, in the present embodiment, after the buildup welding step is applied, the inner corner joining step is applied via the weld metal M formed by the buildup welding step, for plastically fluidizing the weld metal M in addition to the metal members 1, 2 to compensate for the shortage of metal. Accordingly, a joining defect due to the shortage of metal can be prevented. In addition, the buildup welding step is applied prior to the inner corner joining step, to prevent formation of a gap between the metal members 1, 2 at the time of inner corner joining step.

Yet further, in the present embodiment, the butted portion J1 is applied with friction stir welding from the outer corner of the metal members 1, 2, to increase joining strength. Additionally, in the present embodiment, the plasticized region W1 formed in the outer corner joining step is overlapped with the plasticized region W2 formed in the inner corner joining step at the butted portion J1, allowing the entire butted portion J1 in the depth direction to be stirred frictionally. This can improve air tightness and water tightness of the joined portion, and can increase joining strength.

Moreover, in the present embodiment, prior to the buildup welding step, the outer corner of the metal members 1, 2 is joined in the outer corner joining step, to prevent the formation of the gap between the metal members 1, 2 at the time of buildup welding step.

Furthermore, in the inner corner joining step, the primary joining rotary tool F is inclined toward the metal member 1, to allow the stirring pin F2 to be inserted to a deeper position in the butted portion J1, for example, as compared with a case where the stirring pin F2 is inserted along the imaginary reference plane C shown in FIG. 5B, that is, where the stirring pin F2 is inserted at an angle of 45 degrees formed by the side faces 1b, 2b and the rotation center axis Fc with respect to the metal members 1, 2 which are perpendicular to each other. Accordingly, joining can be made to a deeper position in the butted portion J1.

Hereinabove, the first embodiment of the present invention has been described, and design may be suitably modified. For example, in the present embodiment, the inner corner joining step is applied after the outer corner joining step, but these steps can be reversed.

Besides, prior to the outer corner joining step, the provisional joining by friction stirring may be applied along the outer corner of the metal members 1, 2 by the small rotary tool H in the butted portion J1. Or, prior to the outer corner joining step, the provisional joining by welding may be made along the outer corner of the metal members 1, 2 to the butted portion J1. This can prevent the formation of the gap between the metal members 1, 2 at the time of outer corner joining step.

Additionally, the large rotary tool G is used in the outer corner joining step in the present embodiment, but the primary joining rotary tool F may be used instead. Accordingly, friction stirring can be applied to a deeper position in the butted portion J1 without applying large loads on the friction stirring apparatus.

Second Embodiment

Next, a description will be given of a friction stir welding method according to a second embodiment of the present invention. The second embodiment includes: a butting step, an outer corner joining step, a buildup welding step and an inner corner joining step. The second embodiment differs from the first embodiment in that the outer corner joining step is made by welding.

Figure 6A:
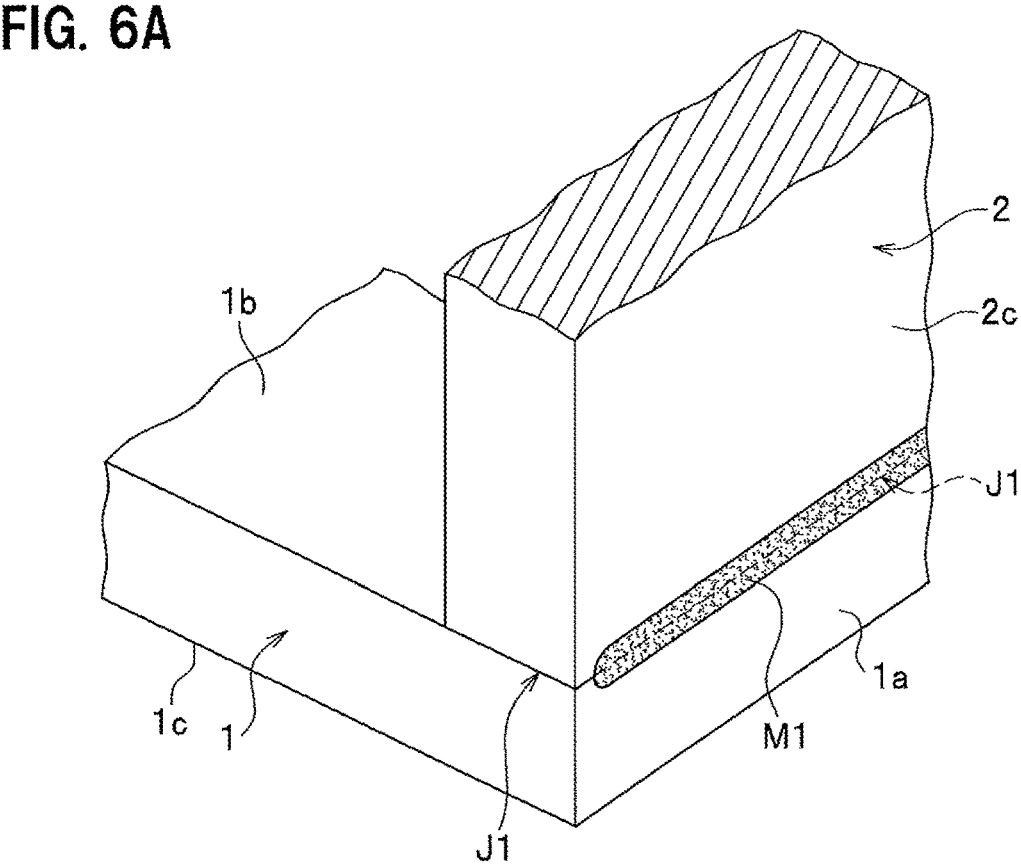
FIG. 6A is a perspective view showing an outer corner joining step and FIG. 6B is a cross-sectional view showing an inner corner joining step, according to a second embodiment.

The butting step is approximately the same as that in the first embodiment and the description thereof will be omitted. As shown in FIG. 6A, the butted portion J1 is welded along the outer corner of the metal members 1, 2 in the outer corner joining step. The weld metal M1 is formed at the butted portion J1 by the outer corner joining step.

Figure 6B:
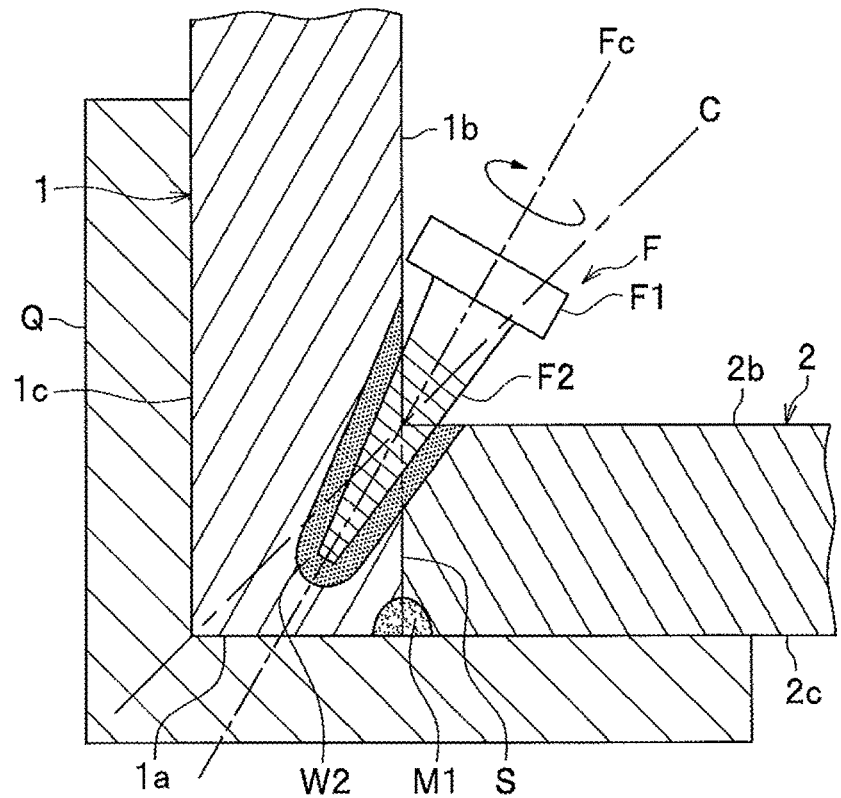

As shown in FIG. 6B, the buildup welding step and the inner corner joining step are approximately the same as those in the first embodiment and the descriptions thereof will be omitted. The friction stir welding method according to the second embodiment can achieve approximately the same effects as those in the first embodiment, except that a space S is formed in the butted portion J1. Further, the outer corner of the metal members 1, 2 is joined by welding prior to the buildup welding step, to prevent the formation of the gap between the metal members 1, 2 at the time of buildup welding step.

It should be noted that, the outer corner joining step is made by welding in the present embodiment, but may be made with the small rotary tool H by friction stirring along the outer corner of the metal members 1, 2 to the butted portion J1.

Further, as shown in FIG. 6B, in the second embodiment, the space S is formed between a weld metal M1 and the plasticized region W2, and the weld metal M1 formed along the outer corner of the metal members 1, 2 in the outer corner joining step or the plasticized region (not shown) formed on the movement path of the small rotary tool H is preferably overlapped with the plasticized region W2 formed in the inner corner joining step. This allows for joining the entire butted portion J1 to fill the space S, and allows for increasing joining strength as well as water tightness and air tightness.

Third Embodiment

Next, a description will be given of a friction stir welding method according to a third embodiment of the present invention. The third embodiment includes: a butting step, a tab member arranging step, an outer corner joining step, an auxiliary member arranging step and an inner corner joining step.

Figure 7A:
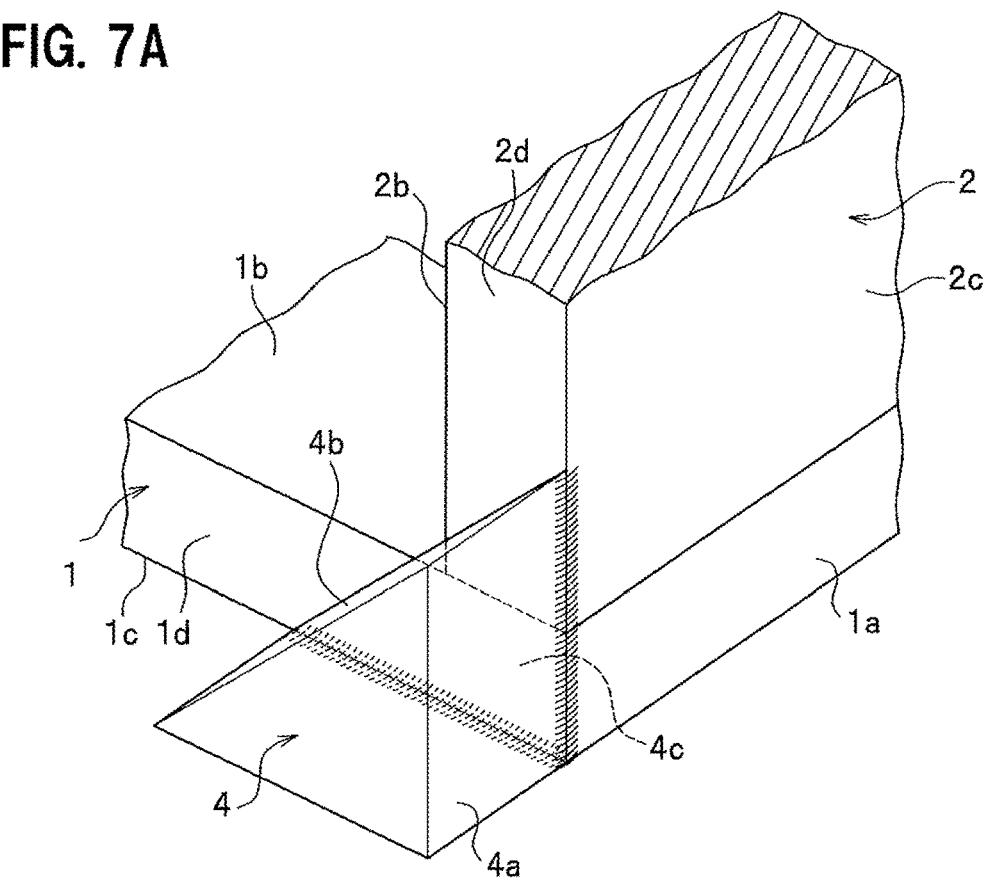
FIG. 7A is a perspective view showing a butting step and a tab member arranging step and FIG. 7B is a perspective view showing an outer corner joining step, according to a third embodiment.

As shown in FIG. 7A, the butting step is approximately the same as that in the first embodiment and the description thereof will be omitted. A tab member 4 is arranged to the metal members 1, 2 in the tab member arranging step. In this embodiment, the tab member 4 has a triangular prism shape and is made of the same material as that of the the metal members 1, 2. The cross section of the tab member 4 has an isosceles right triangle shape.

In the tab member arranging step, the tab member 4 is arranged to one end of the butted portion J1 of the metal members 1, 2 to abut a side face 4c (face having a triangle shape) of the tab member 4 on the side face 1d of the metal member 1 and the side face 2d of the metal member 2. A face 4a of the tab member 4 is made flush with the end face 1a of the metal member 1 and the side face 2c of the metal member 2 so that they are provisionally joined by welding.

After the tab member arranging step, the metal members 1, 2 and the tab member 4 are placed on the mount of the friction stirring apparatus (not shown) so as to be fixed immovably by the jig such as a clamp (not shown).

Figure 7B:
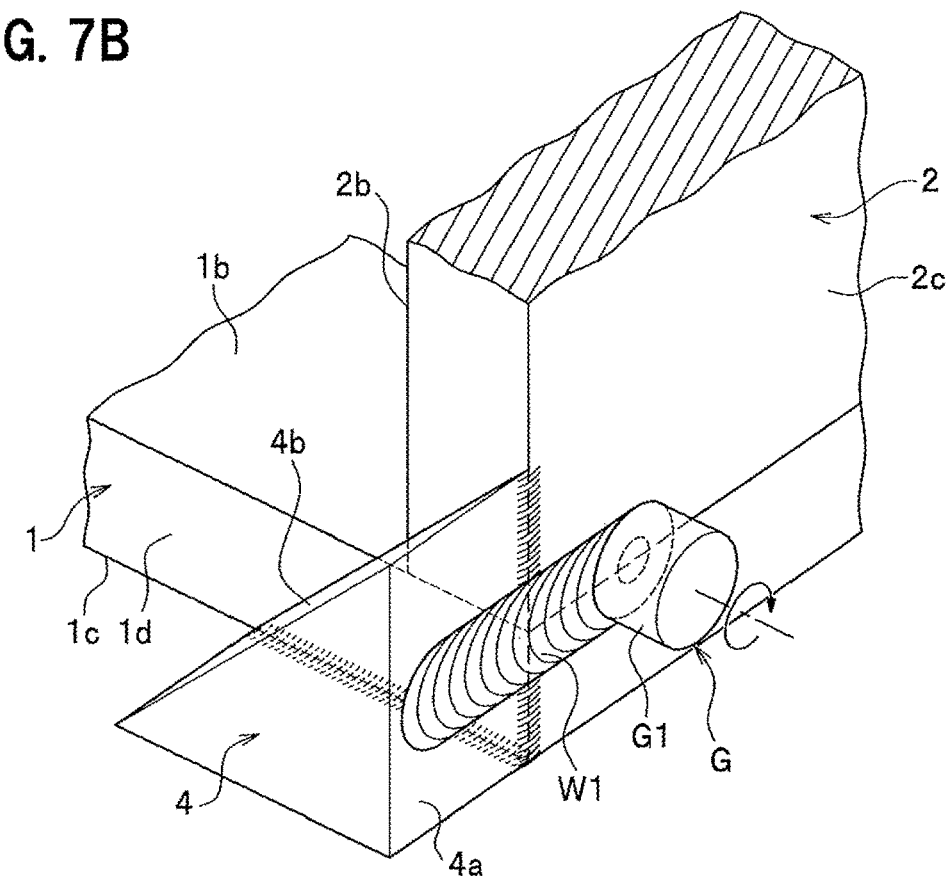

As shown in FIG. 7B, the butted portion J1 of the metal members 1, 2 is applied with friction stir welding along the outer corner of the metal members 1, 2 in the outer corner joining step. The description of the outer corner joining step will be omitted because it is approximately the same as that in the first embodiment except that the tab member 4 is used.

Figure 8A:
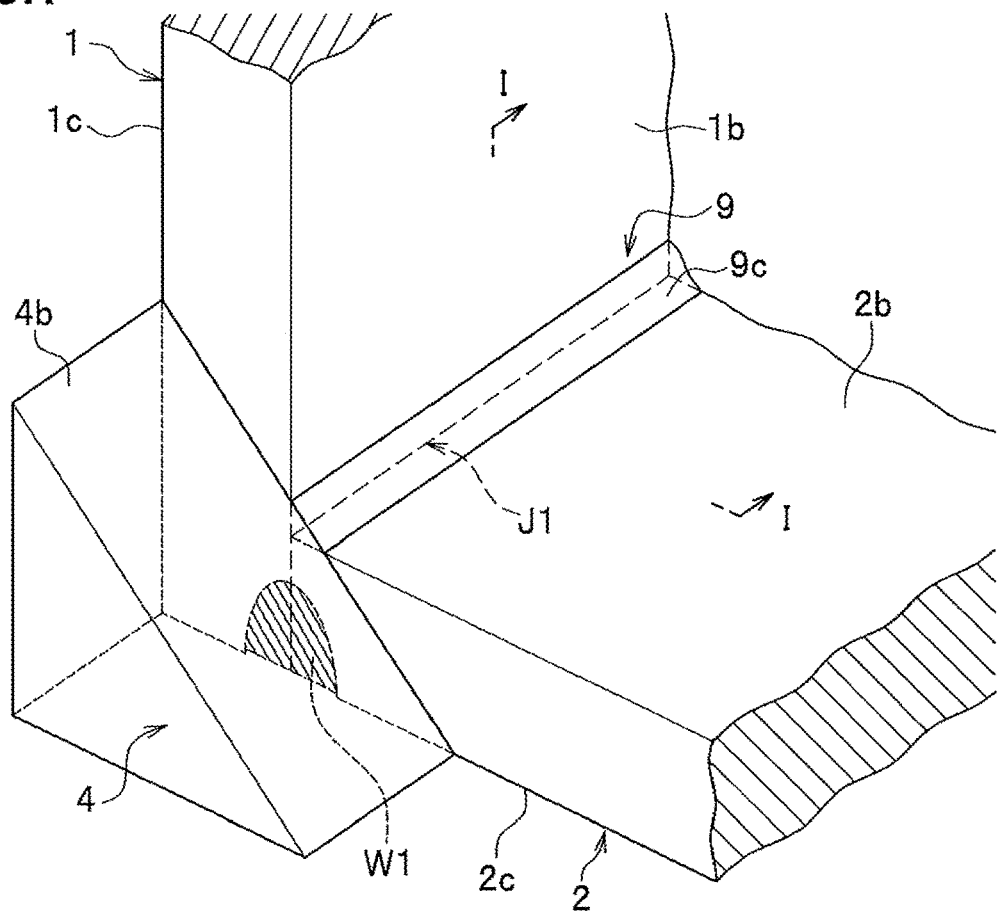
FIG. 8A is a perspective view and FIG. 8B is a cross-sectional view along an I-I line in FIG. 8A showing an auxiliary member arranging step according to the third embodiment.
Figure 8B:
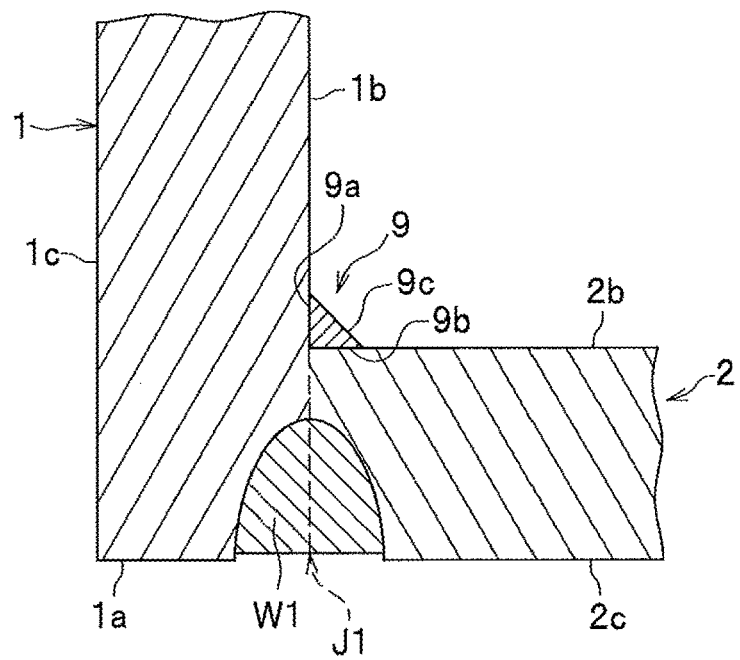

As shown in FIGS. 8A and 8B, an auxiliary member 9 is arranged in the inner corner of the metal members 1, 2 in the auxiliary member arranging step. The auxiliary member 9 has a triangular prism shape and is made of the same material as that of the metal members 1, 2. The cross section of the auxiliary member 9 has an isosceles right triangle shape. The auxiliary member 9 is formed to cover the butted portion J1 in an extension direction.

A side face 9a of the auxiliary member 9 is abutted on the side face 1b of the metal member 1 and a side face 9b is abutted on the side face 2b of the metal member 2 in the auxiliary member arranging step. Further, an inclined face 9c of the auxiliary member 9 is arranged to be flush with an inclined face 4b of the tab member 4. The cross-sectional shape of the auxiliary member 9 may be formed properly according to a butted angle (interior angle) of the metal members 1, 2 such that the side faces 1b, 2b are brought in surface contact with the side faces 9a, 9b, respectively. Still further, the size of the auxiliary member 9 may be set properly such that the metal is not out of short at the time of inner corner joining step to be described later and the amount of metal flowing out by friction stirring is reduced as little as possible.

Figure 9A:
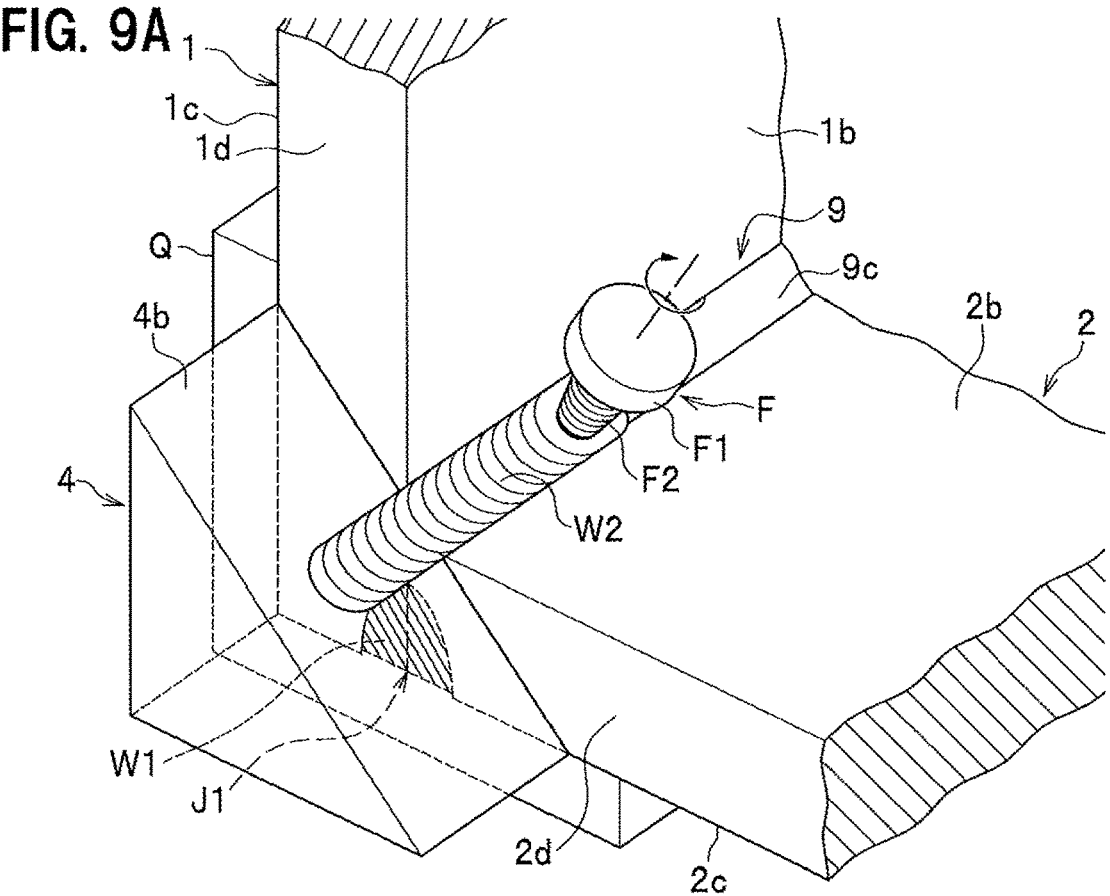
FIG. 9A is a perspective view and FIG. 9B is a cross-sectional view showing an inner corner joining step according to the third embodiment.
Figure 9B:
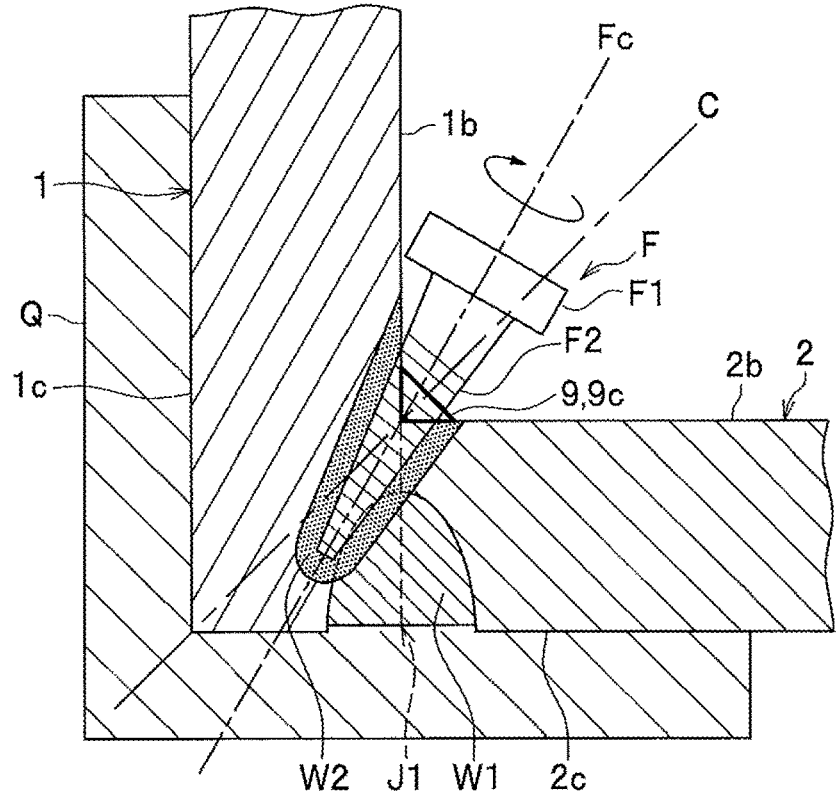

As shown in FIGS. 9A and 9B, the inner corner of the metal members 1, 2 is joined by the primary joining rotary tool F in the inner corner joining step. In the inner corner joining step according to the present embodiment, at first, as shown in FIG. 9A, the backing member Q is arranged on the faces constituting the outer corner of the metal members 1, 2.

The backing member Q is a metal member having an L-shape in a cross section to come in contact with the side face 1c and the end face 1a of the metal member 1, and the side face 2c of the metal member 2. Then, the metal members 1, 2 and the backing member Q are placed on the mount of the friction stirring apparatus (not shown) so as to be immovably fixed by the jig such as a clamp (not shown).

Next, in the inner corner joining step, the primary joining rotary tool F in rotation is inserted into the inclined face 4b of the tab member 4 so as to be relatively moved toward the metal members 1, 2. After reaching the auxiliary member 9, the primary joining rotary tool F continuously carries out friction stir welding along the auxiliary member 9 and the butted portion J1. In the inner corner joining step, as shown in FIGS. 9A and 9B, the coupling portion F1 of the primary joining rotary tool F is separated from the metal members 1, 2 to insert only the stirring pin F2 into the butted portion J1 via the auxiliary member 9. Along the movement path of the primary joining rotary tool F, the plasticized region W2 is formed. Since an insertion angle of the primary joining rotary tool F is the same as that in the first embodiment, the description thereof will be omitted.

According to the friction stir welding method of the present embodiment described above, in the inner corner joining step for joining the inner corner of the metal members 1 and 2, only the stirring pin F2 is made to contact with the metal members 1 and 2, to prevent the side face 1b of the metal member 1 and the side face 2b of the metal member 2 from being damaged at the time of joining.

In addition, in the present embodiment, the auxiliary member 9 is arranged in the inner corner of the metal members 1 and 2, and the auxiliary member 9 and the metal members 1, 2 are applied with friction stirring, for plastically fluidizing the auxiliary member 9 as well as the metal members 1, 2, to compensate for the shortage of metal. Accordingly, a joining defect of the metal members can be avoided.

In the present embodiment, the butted portion J1 is applied with friction stir welding also along the outer corner of the metal members 1, 2, to increase joining strength. Further, in the present embodiment, on the butted portion J1, the plasticized region W1 formed in the outer corner joining step is overlapped with the plasticized region W2 formed in the inner corner joining step, to allow the entire butted portion J1 in the depth direction to be stirred frictionally. Accordingly, this can improve air tightness and water tightness of the joined portion, and increase joining strength.

Further, the outer corner joining step is applied prior to the inner corner joining step, to prevent the gap between the metal members 1, 2 in the auxiliary member arranging step and the inner corner joining step.

Still further, in the inner corner joining step, the primary joining rotary tool F is inclined toward the metal member 1 to allow the stirring pin F2 to be inserted to a deeper position in the butted portion J1, for example, as compared with a case where the stirring pin F2 is inserted along the imaginary reference plane C shown in FIG. 9B, that is, where the stirring pin F2 is inserted at an angle of 45 degrees formed by the side faces 1b, 2b and the rotation center axis Fc with respect to the metal members 1, 2 which are perpendicular to each other. Accordingly, joining can be made to a deeper position in the butted portion J1.

Yet further, the inclined face 4b of the tab member 4 is made flush with the inclined face 9c of the auxiliary member 9, to facilitate carrying out the inner corner joining step. Also, the tab member 4 is cut off after the inner corner joining step, to neatly finish the side face 1d of the metal member 1 and the side face 2d of the metal member 2 while the end portion of the butted portion J1 is securely joined.

The third embodiment is described above and design may be appropriately modified. For example, in the present embodiment, the inner corner joining step is applied after the outer corner joining step, but these steps can be reversed.

Also, prior to the outer corner joining step, the butted portion J1 may be applied with provisional joining along the outer corner of the metal members 1, 2 with the small rotary tool H by frictional stirring. Or, prior to the outer corner joining step, the butting portion J1 may be applied with provisional joining along the outer corner of the metal members 1, 2 by welding. Accordingly, the formation of the gap between the metal members 1, 2 can be prevented at the time of outer corner joining step.

Furthermore, in the present embodiment, the large rotary tool G is used in the outer corner joining step, but the primary joining rotary tool F may be used. Accordingly, friction stirring can be applied to a deeper position in the butted portion J1 without applying large loads to the frictional stirring apparatus.

Fourth Embodiment

Next, a description will be given of a friction stir welding method according to a fourth embodiment of the present invention. The fourth embodiment includes a butting step; a tab member arranging step; an outer corner joining step; an auxiliary member arranging step; and an inner corner joining step. The outer corner joining step in the fourth embodiment differs from the third embodiment in that the small rotary tool H is used.

Figure 10A:
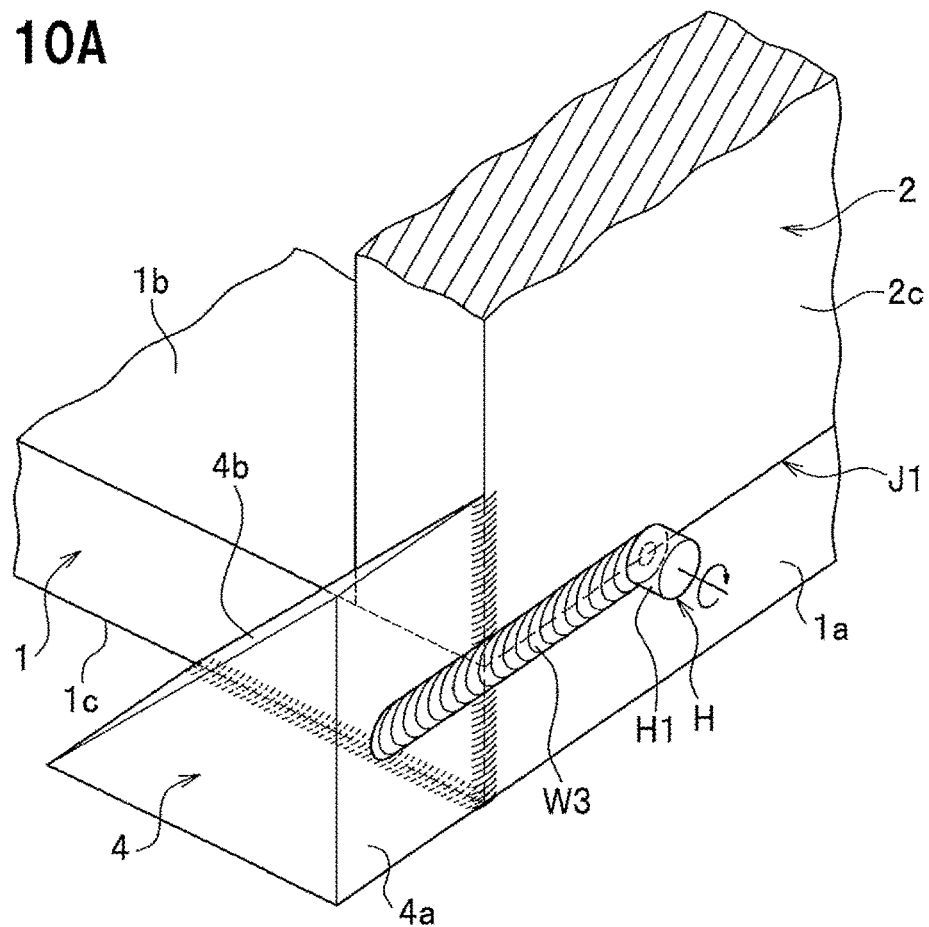
FIG. 10A is a perspective view showing an outer corner joining step and FIG. 10B is a cross-sectional view showing an inner corner joining step, according to a fourth embodiment of the present invention.

The butting step and the tab member arranging step are approximately the same as those in the third embodiment, and the description thereof will be omitted. As shown in FIG. 10A, the butted portion J1 is applied with friction stir welding along the outer corner of the metal members 1, 2 in the outer corner joining step.

In the outer corner joining step, the small rotary tool H is inserted in the face 4a of the tab member 4 so as to be relatively moved toward the metal members 1, 2, and to be relatively moved continuously along the butted portion J1. Along the movement path of the small rotary tool H, a plasticized region W3 is formed.

Figure 10B:
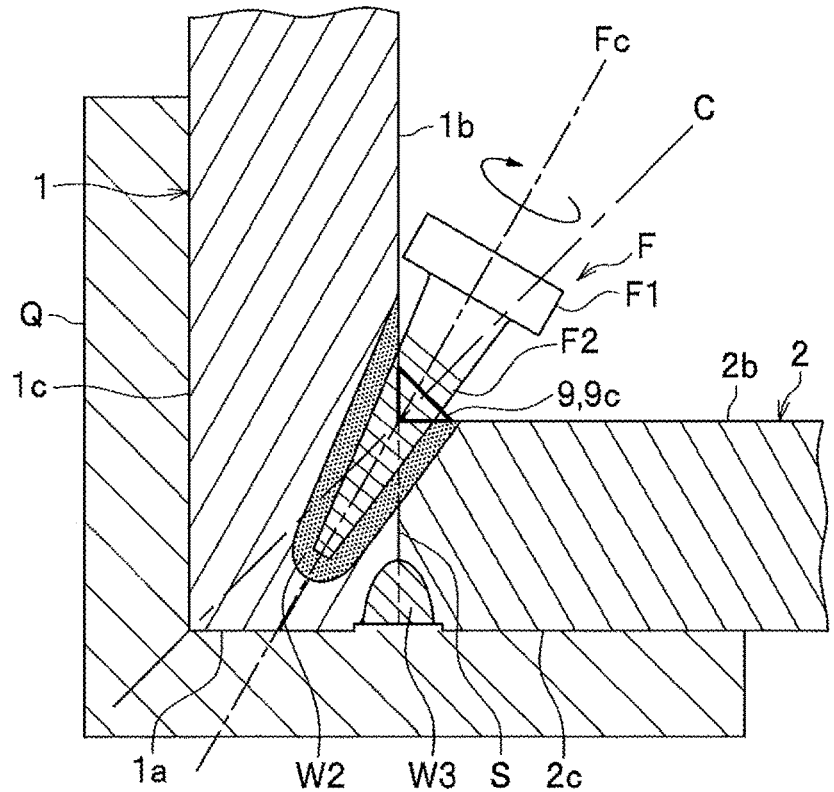

As shown in FIG. 10B, the auxiliary member arranging step and the inner corner joining step are approximately the same as those in the third embodiment, and the description thereof will be omitted. The friction stir welding method according to the fourth embodiment can obtain approximately the same effects as those obtained in the third embodiment, except that a space S is formed at the butted portion J1. Further, the outer corner of the metal members 1, 2 are joined by friction stirring prior to the auxiliary member arranging step, to prevent a gap from being separated between the metal members 1, 2 at the time of auxiliary member arranging step.

It should be noted that, in the present embodiment, the outer corner joining step is applied using the small rotary tool H by friction stir welding, but may be applied by welding to the butted portion J1 along the outer corner of the metal members 1, 2.

Further, as shown in FIG. 10B, in the fourth embodiment, though the space S is formed between the plasticized region W2 and the plasticized region W3, the plasticized region W3 or the weld metal (not shown) formed along the outer corner of the metal members 1, 2 in the outer corner joining step is preferably overlapped with the plasticized region W2 formed in the inner corner joining step. Accordingly, the entire butted portion J1 is joined to fill the space S in the butted portion J1, to allow for increasing joining strength, in addition to water tightness and air tightness.

Fifth Embodiment

Next, a description will be given of a friction stir welding method according to a fifth embodiment of the present invention. The fifth embodiment differs from the embodiments described above in that an outer corner rejoining step is applied. The fifth embodiment will be described, focusing on portions different from the above-mentioned embodiments.

Figure 11A:
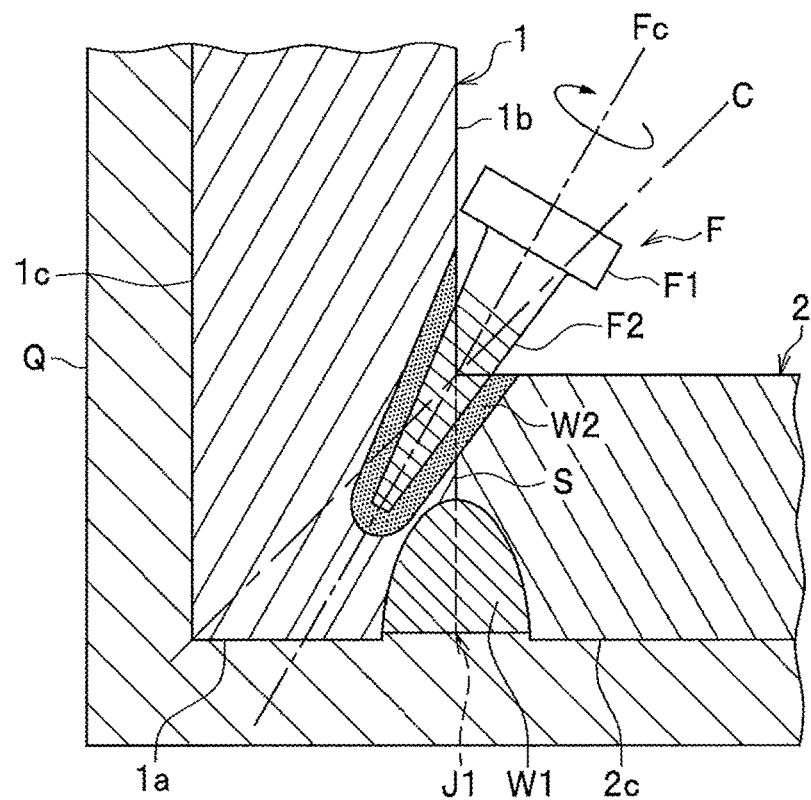
FIG. 11A is a cross-sectional view showing an inner corner joining step and FIG. 11B is a cross-sectional view showing an outer corner rejoining step, according to a fifth embodiment of the present invention.

FIG. 11A is a cross-sectional view showing an inner corner joining step according to the fifth embodiment. In the fifth embodiment, prior to the inner corner joining step, an outer corner joining step is applied so that the plasticized region W1 is formed along the outer corner of the butted portion J1. As shown in FIG. 11A, for example, when thick metal members 1, 2 are joined, friction stir welding may not be applied to the entire butted portion J1 even the outer corner joining step and the inner corner joining step are applied.

In other words, the plasticized region W1 formed in the outer corner joining step may not be overlapped with the plasticized region W2 formed in the inner corner joining step in the butted portion J1, causing the space S to be formed. Similarly, in the cases as shown in FIGS. 6 and 10, the space S is formed in the butted portion J1.

Figure 11B:
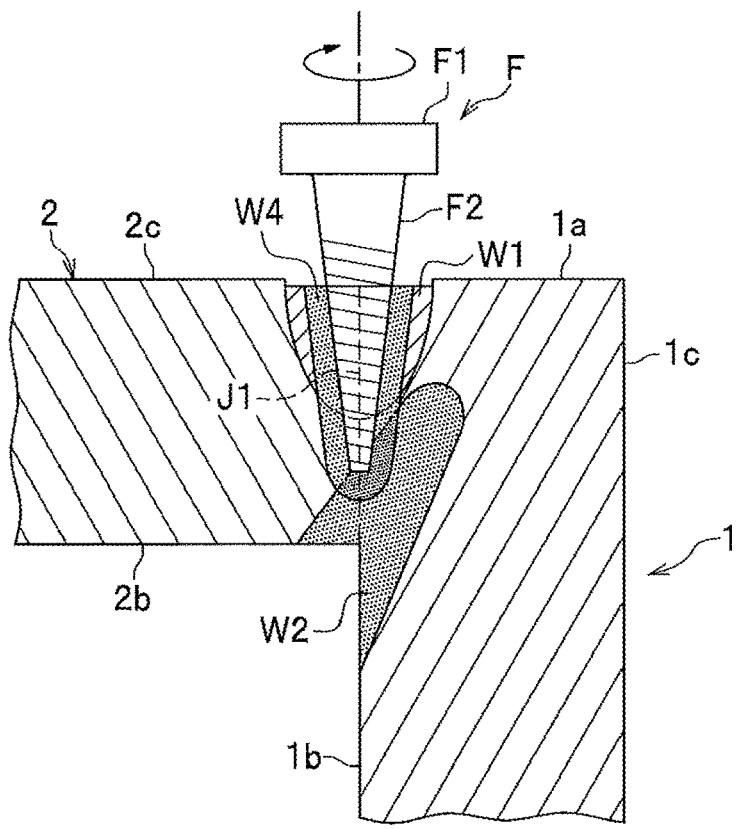

Thus, in the case where the space S is formed in the butted portion J1, as shown in FIG. 11B, the butted portion J1 is preferably applied with the outer corner rejoining step along the outer corner of the metal members 1, 2 by the primary joining rotary tool F. In the outer corner rejoining step, friction stirring is applied in a condition where only the stirring pin F2 of the primary joining rotary tool F is in contact with the metal members 1, 2. Along the movement path of the primary joining rotary tool F in the outer corner rejoining step, a plasticized region W4 is formed.

Since the primary joining rotary tool F is used in the outer corner rejoining step, friction stirring can be applied to a deeper position in the butted portion J1 without applying large loads to the frictional stirring apparatus. Accordingly, the space S formed in the butted portion J1 is stirred frictionally, to allow for increasing joining strength in addition to water tightness and air tightness of the butted portion J1.

First Modification

Figure 12:
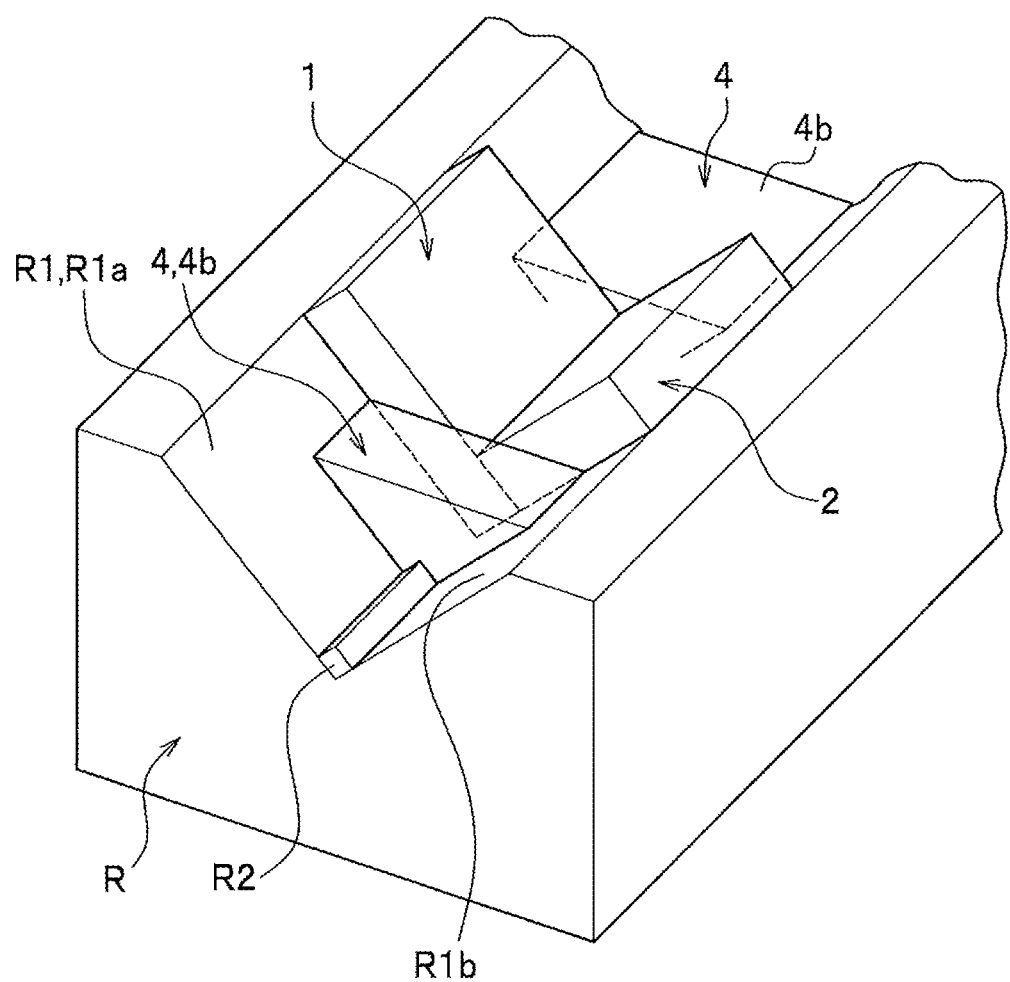
FIG. 12 is a perspective view showing an inner corner joining mount according to a first modification of the present invention.

Next, a description will be given of a first modification of the friction stir welding method according to the present invention. Though the embodiments described above use the backing member Q applied on the back side of the metal members 1, 2 in the inner corner joining step, an inner corner joining mount R may be used as shown in FIG. 12 instead.

The inner corner joining mount R includes a recess R1 on a face of a metal member having a rectangular parallelepiped shape. The recess R1 includes a first inclined face R1a and a second inclined face R1b. The interior angle between the first inclined face R1a and the second inclined face R1b is, for example, 90 degrees.

In the butted step in the modification, the metal members 1, 2 are arranged along the recess R1. Also, in the tab member arranging step, the tab members 4, 4 are arranged on both sides of the butted portion J1 of the metal members 1, 2. The tab members 4, 4 are arranged such that the inclined faces 4b, 4b face upward. Once the tab members 4, 4 are arranged, the metal members 1, 2 and tab members 4, 4 are sandwiched by fixing jigs R2, R2 (only one is shown) so as to be fixed immovably.

The use of inner corner joining mount R in the first modification can easily carry out the butting step and the tab member arranging step because the metal members 1, 2 and the tab members 4, 4 only need to be arranged in the recess R1. Besides, the buildup welding step, the auxiliary member arranging step, the inner corner joining step and the like can be applied stably using the inner corner joining mount R.

In the present embodiment, though the internal angle of the metal members 1, 2 is set to 90 degrees, it may be set to other angles. In such a case, the internal angle between the first inclined face R1a and the second inclined face R1b is changed appropriately to butt the metal members 1, 2 at various angles.

Sixth Embodiment

Next, a description will be given of a friction stir welding method according to a sixth embodiment of the present invention. The friction stir welding method according to the present embodiment includes a butting step, a buildup welding step and a joining step.

Figure 13A:
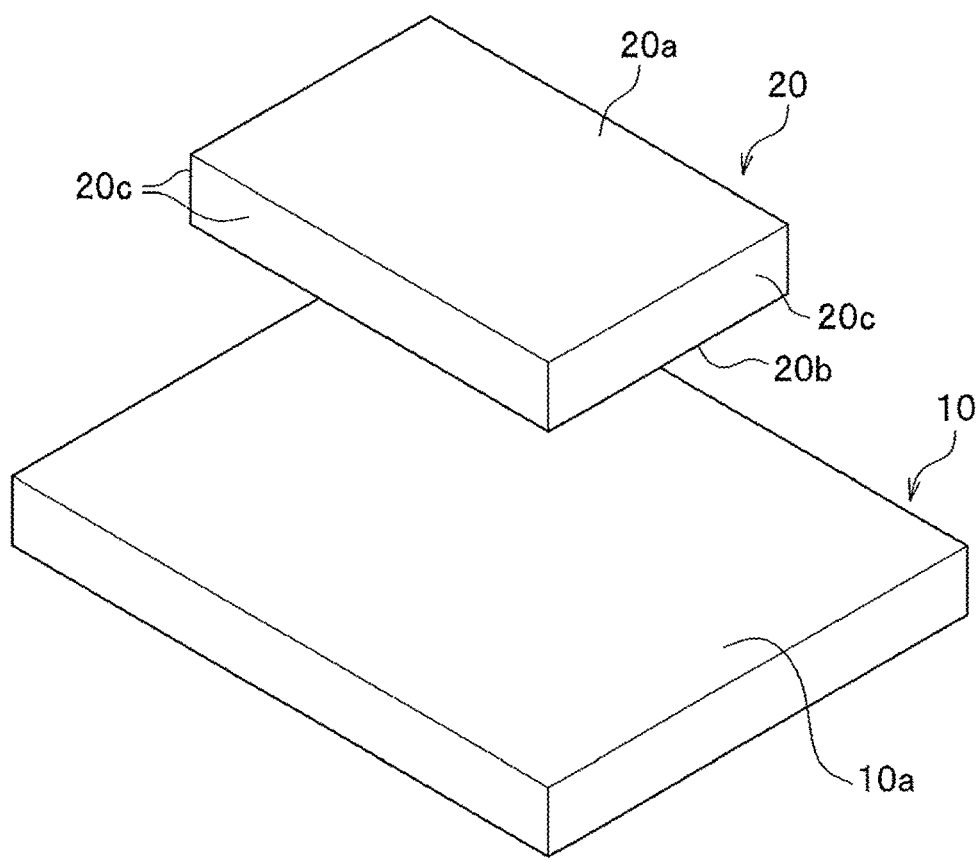
FIG. 13A is a perspective view of metal members prior to butting according to a sixth embodiment and FIG. 13B is a perspective view of the metal members after the butting.
Figure 13B:
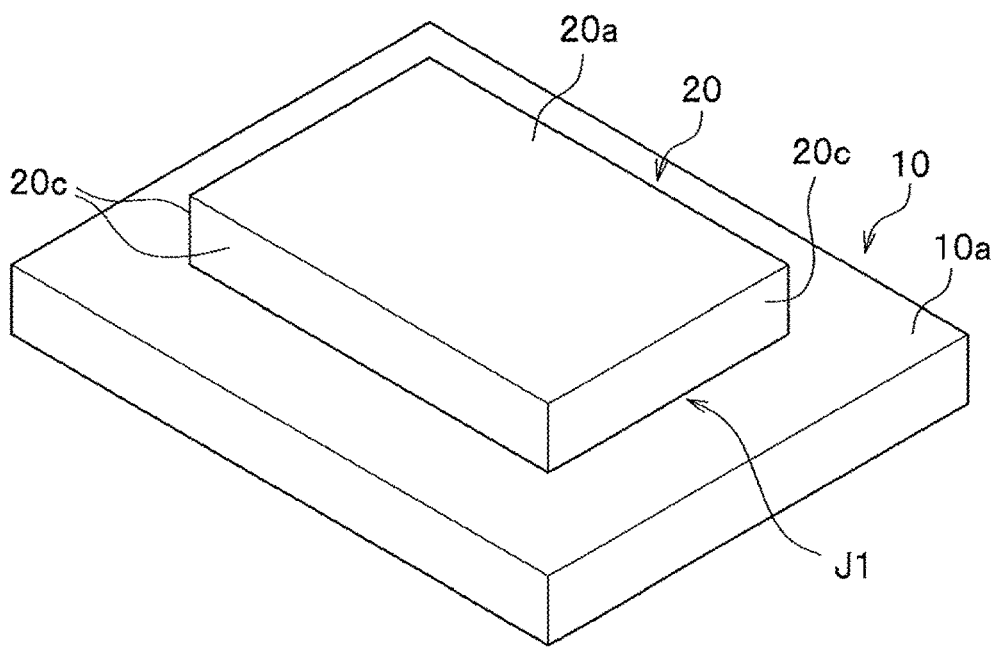

As shown in FIGS. 13A and 13B, in the present embodiment, the butted portion J1 formed by butting metal members 10, 20 is joined by friction stirring. The metal members 10, 20 are made of metal and have a rectangular parallelepiped shape (plate shape). The metal members 10, 20 are formed of the same material. The material of the metal members 10, 20 is not particularly limited as long as it is frictionally stirrable metal, and may be suitably selected from, for example, aluminum, aluminum alloy, copper, copper alloy, titanium, titanium alloy, magnesium, magnesium alloy or the like.

The metal member 20 is smaller than the metal member 10. In other words, the area of a lower face 20b of the metal member 20 arranged above is smaller than the area of an upper face 10a of the metal member 10 arranged below.

The metal members 10, 20 are butted to form the butted portion J1 in the butting step. As shown in FIG. 13A, in the butting step, the lower face 20b of the metal member 20 is butted on the central portion in the upper face 10a of the metal member 10. The metal members 10, 20 have butted faces (upper face 10a, lower face 20b) having different shapes from each other, to form inner corners by butting and to expose margins of the upper face 10a of the metal member 10. As shown in FIG. 13B, the inner corner is formed by the upper face 10a of the metal member 10 and a side face 20c of the metal member 20. The inner corners are formed along the entire circumferential direction of the metal member 10. It should be noted that the "two metal members having faces to be butted in different shapes from each other" in claims includes the case where the shapes of faces (upper face 10a, lower face 20b) to be butted are similar as with the metal members 10, 20 in the present embodiment.

Figure 14A:
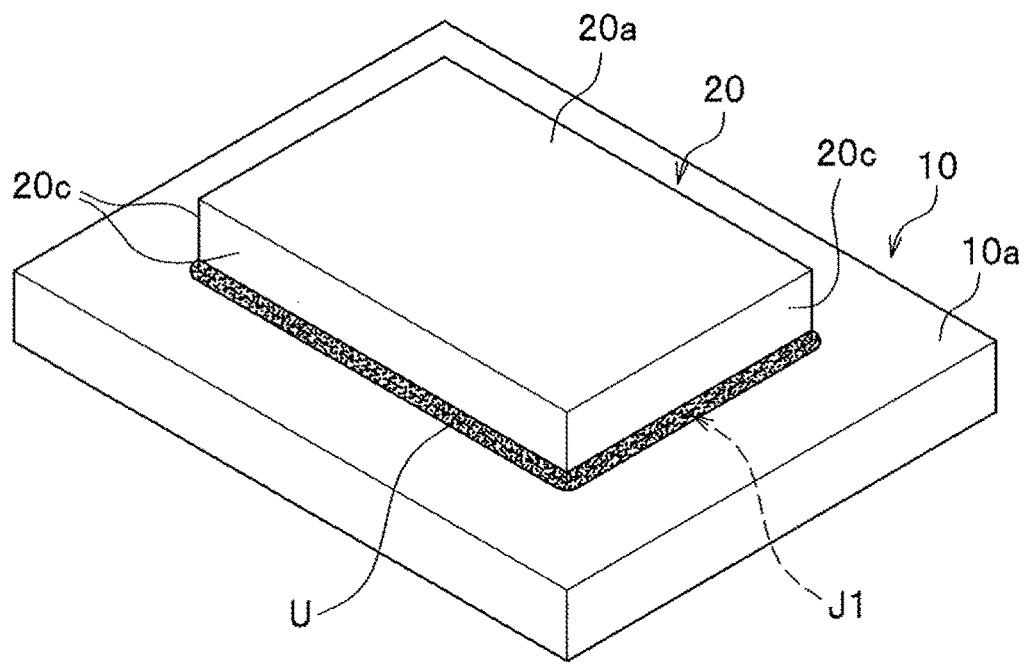
FIG. 14A is a perspective view showing a buildup welding step and FIG. 14B is a perspective view showing a joining step according to the sixth embodiment.

The butted portion J1 is applied with buildup welding along the circumferential direction of the metal member 10 in the buildup welding step. As shown in FIG. 14A, in the buildup welding step, buildup welding such as the TIG welding or the MIG welding is applied along the entire circumference of the butted portion J1. With the buildup welding step, the entire circumference of the inner corner is covered by a weld metal U. The buildup amount of the weld metal U is preferably set to an extent that, after the joining step, a groove is not formed on the face of the plasticized region W (joined portion) or the weld metal U does not protrude from the face.

Figure 14B:
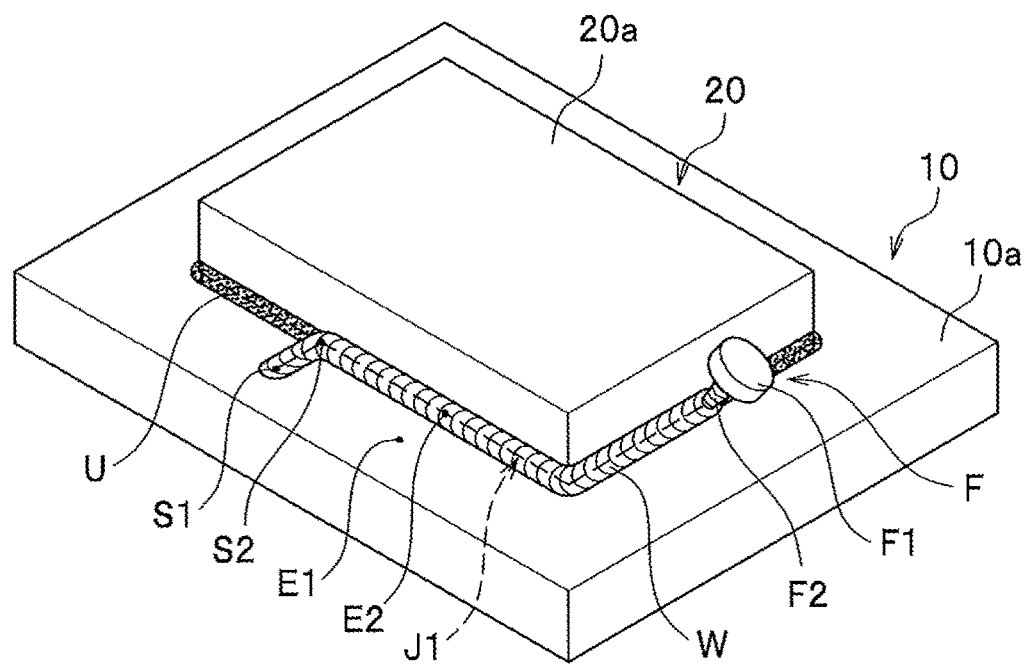

The stirring pin F2 is inserted in the inner corner via the weld metal U to carry out friction stirring along the circumferential direction of the metal member 20 in the joining step. As shown in FIG. 14B, in the joining step, the butted portion J1 is applied with friction stirring with the primary joining rotary tool F. First, the primary joining rotary tool F rotating clockwise is inserted in a start position S1 set on the upper face 10a of the metal member 10.

Figure 15A:
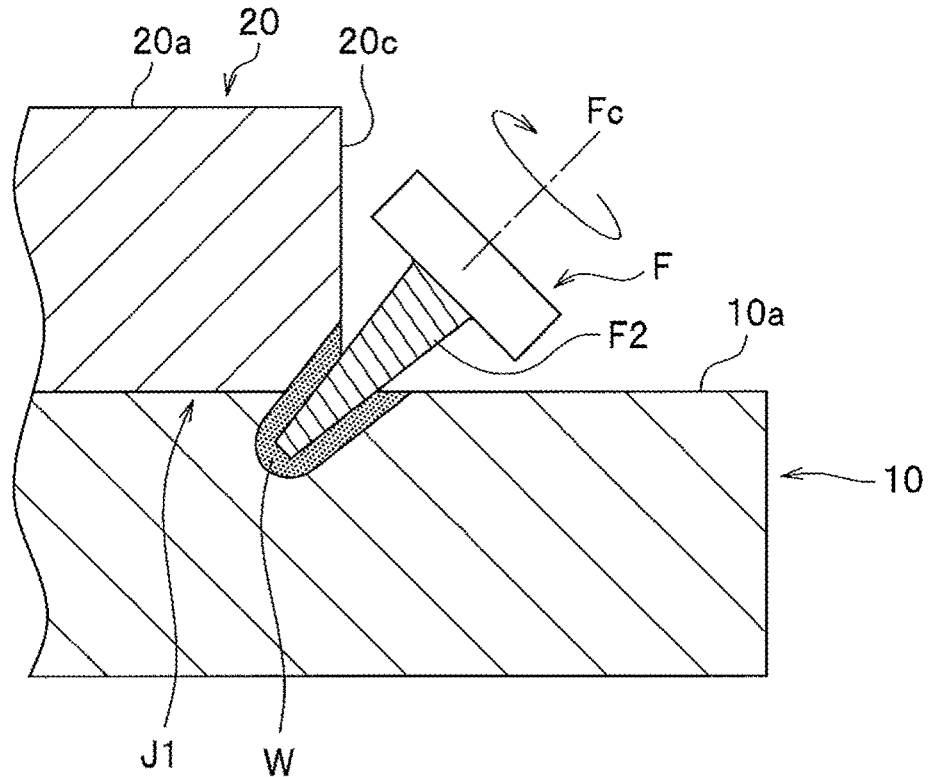
FIG. 15A is a cross-sectional view showing a joining step and FIG. 15B is a perspective view after the joining step, according to the sixth embodiment.

The primary joining rotary tool F is relatively moved toward a start point S2 that is set on the butted portion J1 and once it reaches the start point S2, the primary joining rotary tool F is operated along the butted portion J1 around the entire metal member 20. In other words, in the joining step, friction stirring is applied so as to trace the weld metal U. As shown in FIG. 15A, in the joining step, friction stirring is applied in a condition where only the stirring pin F2 is brought into contact with the metal members 10, 20 and the weld metal U. That is, friction stirring is applied in a condition where the base end of the stirring pin F2 is exposed. Along the movement path of the primary joining rotary tool F, the plasticized region W is formed. An insertion angle of the stirring pin F2 may be set appropriately, and, in the present embodiment, the rotation center axis of the primary joining rotary tool F is inclined at an angle of 45 degrees with respect to the vertical plane.

Figure 15B:
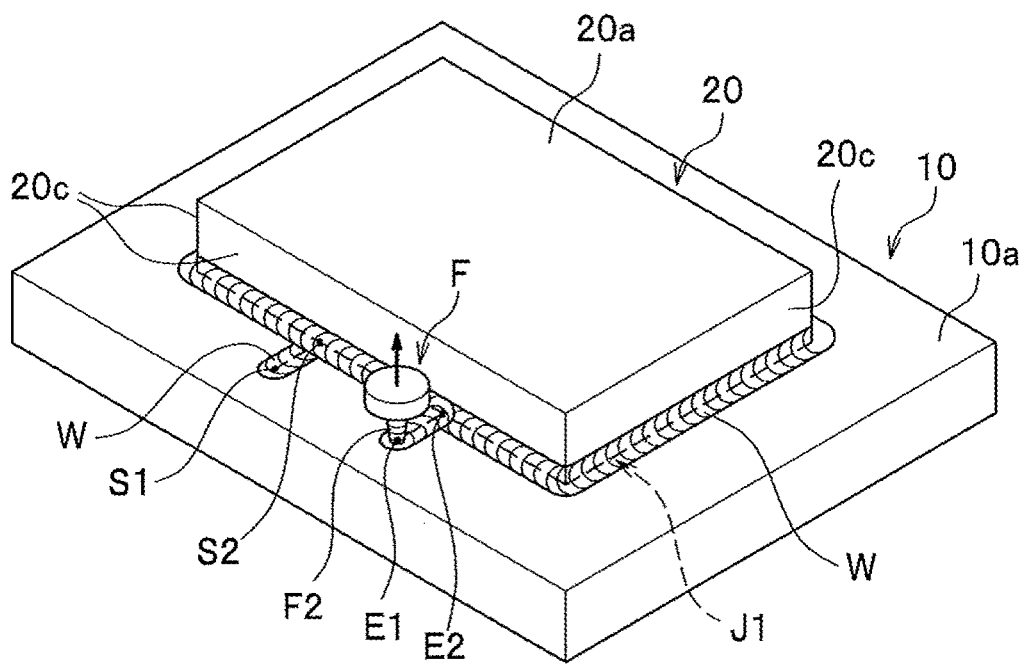

As shown in FIG. 15B, the primary joining rotary tool F is operated along the circumference of the entire metal member 20 through the start point S2 and once it reaches a stop point E2 set on the butted portion J1, the primary joining rotary tool F is relatively moved toward the upper face 10a. Then, the primary joining rotary tool F is disengaged at an end position E1 set on the upper face 10a. This makes the start end (start point S2) overlap with the stop end (stop point E2) of the plasticized region W in the butted portion J1.

After the primary joining rotary tool F is disengaged from the upper face 10a, a through hole of the stirring pin F2 remains on the upper face 10a. For example, a repairing step may be applied to repair the through hole, for example, by buildup welding or the like to the through hole.

According to the friction stir welding method described above, the inner corner is applied with buildup welding in advance to carry out friction stirring to the butted portion J1 over the weld metal U, to avoid the shortage of metal in the inner corner. Further, in the joining step, the start end is overlapped with the stop end in the plasticized region W, to increase water tightness and air tightness. Still further, the metal member 20 is joined continuously along the circumferential direction thereof, to increase joining strength.

Seventh Embodiment

Next, a description will be given of a friction stir welding method according to a seventh embodiment of the present invention. The friction stir welding method according to the present embodiment differs from the sixth embodiment in that a first auxiliary member 30 and a second auxiliary member 31 are arranged on the butted portion J1 for friction stirring. The friction stir welding method according to the seventh embodiment will be described, focusing on portions different from the sixth embodiment.

The friction stir welding method according to the present embodiment includes: a butting step, an auxiliary member arranging step and a joining step. The butting step is applied in the same manner as that in the sixth embodiment.

Figure 16A:
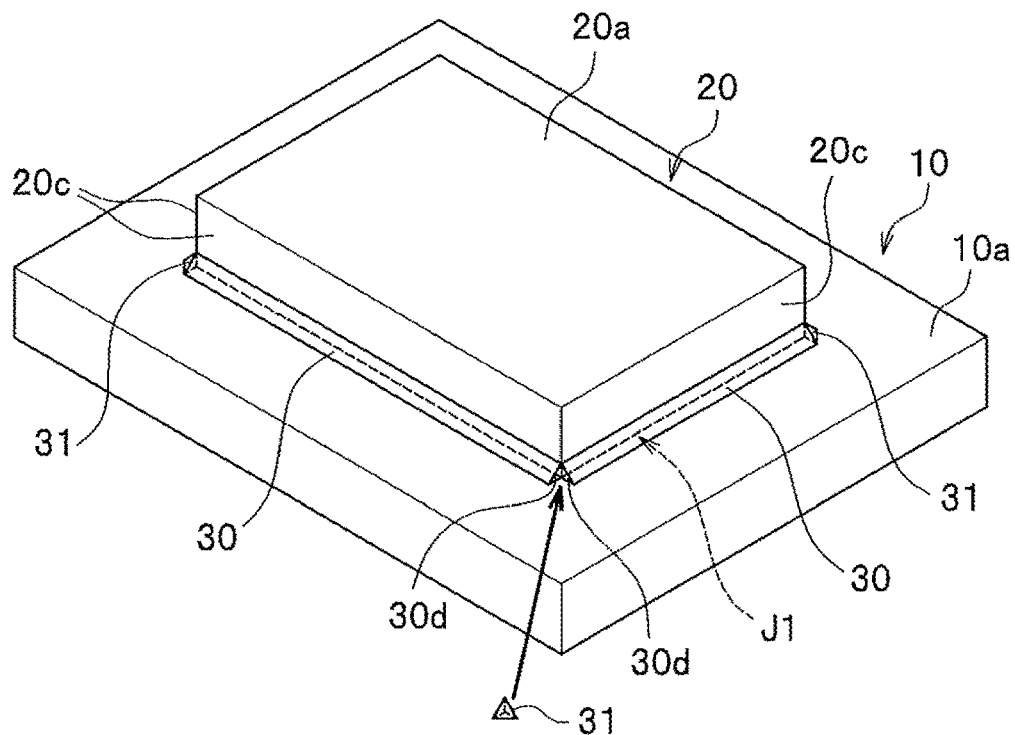
FIG. 16A is a perspective view and FIG. 16B is a side view showing an auxiliary member arranging step according to a seventh embodiment.

As shown in FIG. 16A, four first auxiliary members 30 and four second auxiliary members 31 are arranged to the butting portion J1 along the circumferential direction of the metal member 20 in the auxiliary member arranging step. Each first auxiliary member (auxiliary member) 30 is made of metal and has a triangular prism shape. The first auxiliary member 30 may be metal to be frictionally stirrable, and is preferably formed of the same material as that of the metal members 10, 20 as in the present embodiment.

Figure 16B:
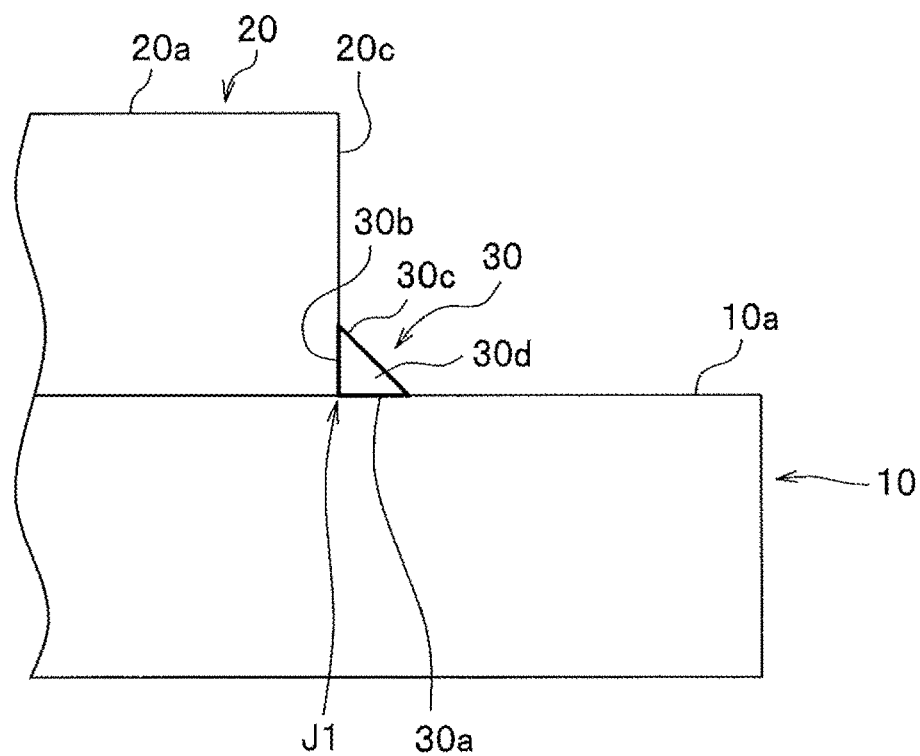

The first auxiliary member 30 has a right triangle shape in cross-section. The length of the first auxiliary member 30 is equal to the length of each side of the metal member 20. As shown in FIG. 16B, in the auxiliary member arranging step, a bottom face 30a of the first auxiliary member 30 is brought in surface contact with the upper face 10a of the metal member 10, and a rising face 30b of the metal member 30 is brought in surface contact with the side face 20c of the metal member 20. In the auxiliary member arranging step, the four first auxiliary members 30 are arranged along the four sides of the metal member 20, respectively.

The second auxiliary member (auxiliary member) 31 is made of metal and is in a tetrahedron shape. The second auxiliary member 31 may be metal to be stirrable frictionally, and is preferably formed of the same material as that of the metal members 10, 20 as in this embodiment.

Figure 17:
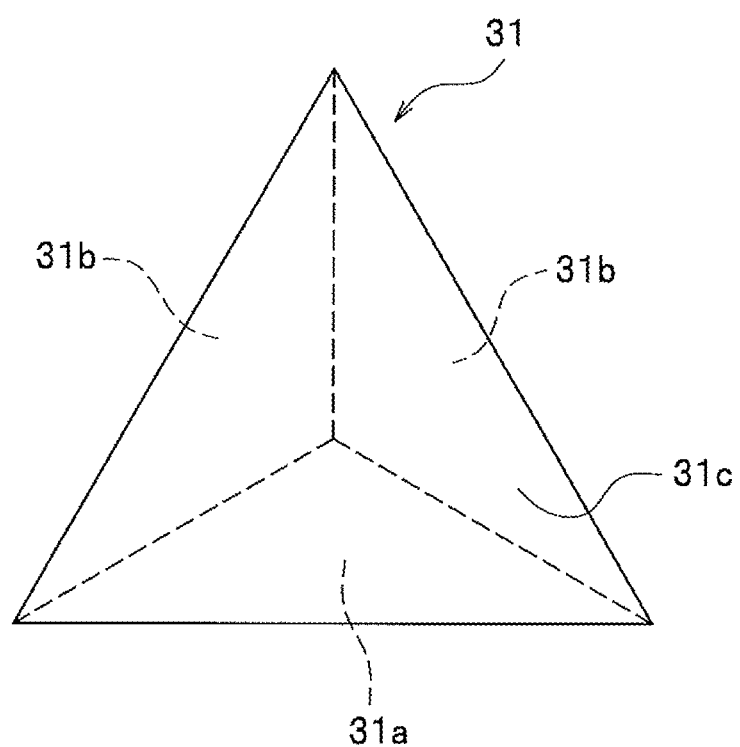
FIG. 17 is a perspective view showing a second auxiliary member according to the seventh embodiment.

As shown in FIG. 17, a bottom face 31a of the second auxiliary member 31 is in an isosceles right triangle shape. Rising faces 31b, 31b of the second auxiliary member 31 are both in an isosceles right triangle shape. The rising faces 31b, 31b of the second auxiliary member 31 have the same shape as an end face 30d of the first auxiliary member 30 (see FIG. 16B). As shown in FIG. 16A, in the auxiliary member arranging step, the second auxiliary members 31 are arranged at four corners of the butted portion J1.

In the auxiliary member arranging step, the bottom face 31a of the second auxiliary member 31 is brought in surface contact with the upper face 10a of the metal member 10. In addition, the rising faces 31b, 31b of the second auxiliary member 31 are brought in surface contact with the end faces 30d, 30d of the adjacent first auxiliary members 30, respectively. This covers the circumference of the inner corner (butted portion J1) with the four first auxiliary members 30 and the four second auxiliary members 31. Inclined faces 30c, 30c of the adjacent first auxiliary members 30 are arranged continuously to an inclined face 31c of the second auxiliary member 31. The size of the first auxiliary member 30 and the second auxiliary member 31 is preferably set to an extent that, after the joining step, a groove is not formed on a face of the plasticized region W (joined portion), and each auxiliary member does not remain on the face.

Figure 18:
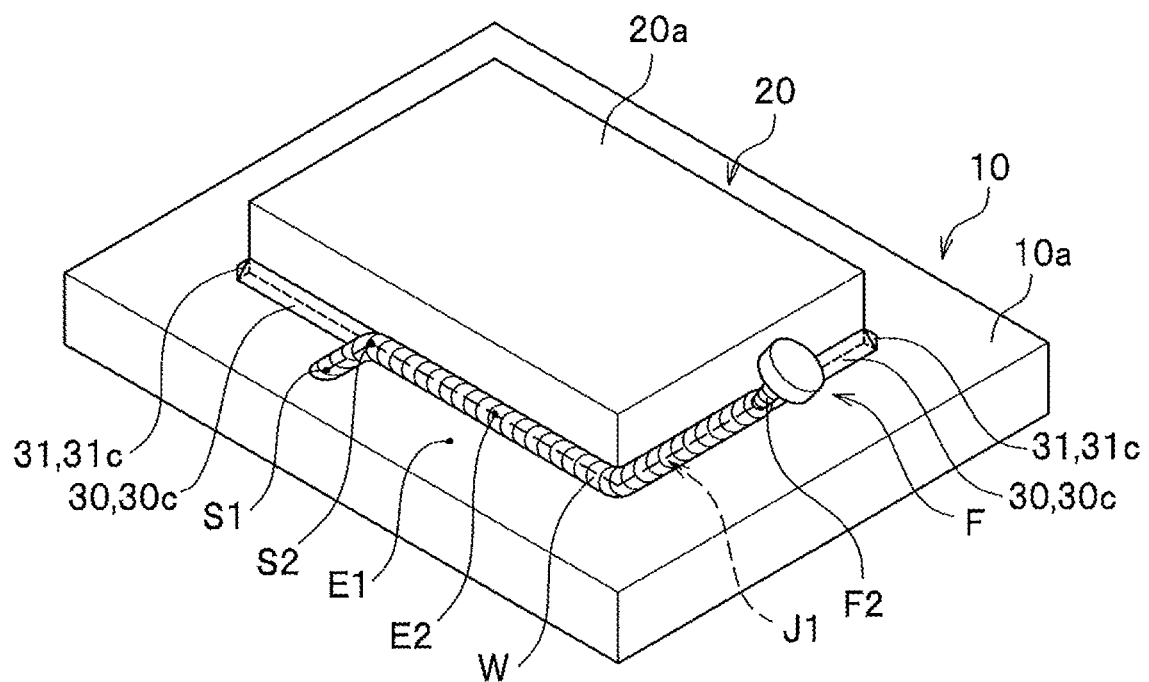
FIG. 18 is a perspective view showing a joining step according to the seventh embodiment.

The stirring pin F2 is inserted in the inner corner via the first auxiliary member 30 and the second auxiliary member 31, and friction stirring is applied along the circumferential direction of the metal member 20 in the joining step. As shown in FIG. 18, in the joining step, the butted portion J1 is applied with friction stirring by the primary joining rotary tool F. First, the primary joining rotary tool F rotating clockwise is inserted in the start position S1 that is set on the upper face 10a of the metal member 10.

Then, the primary joining rotary tool F is relatively moved toward the start point S2 that is set on the butted portion J1, and once the primary joining rotary tool F reaches the start point S2, the primary joining rotary tool F is operated around the metal member 20 along the butted portion J1. In other words, in the joining step, friction stirring is applied so as to trace the inclined faces 30c, 31c. As shown in FIG. 18, in the joining step, friction stirring is applied in a condition where only the stirring pin F2 is brought into contact with the metal members 10 and 20, and the first and second auxiliary members 30, 31. That is, friction stirring is applied in a condition where the base end of the stirring pin F2 is exposed. Along the movement path of the primary joining rotary tool F, the plasticized region W is formed. Though an insertion angle of the stirring pin F2 may be set as appropriate, the rotation center axis of the primary joining rotary tool F in this embodiment is inclined at an angle of 45 degrees with respect to the vertical plane. In short, friction stirring is applied in a condition where the rotation center axis of the primary joining rotary tool F is set perpendicular to the inclined faces 30c, 31c.

When the primary joining rotary tool F is operated around the metal member 20 through the start point S2 to reach the stop point E2 which is set on the butted portion J1, the primary joining rotary tool F is relatively moved toward the upper face 10a. Then, the primary joining rotary tool F is disengaged at the end position E1 which is set on the upper face 10a. Accordingly, in the plasticized region W of the butted portion J1, the start end (start point S2) is overlapped with the stop end (stop point E2).

Once the primary joining rotary tool F is disengaged from the upper face 10a, a through hole of the stirring pin F2 remains on the upper face 10a. For example, a repairing step may be applied to repair the through hole, for example, by buildup welding or the like to the through hole.

According to the friction stir welding method described above, the first and second auxiliary members 30, 31 are arranged along the inner corners to carry out friction stirring to the butted portion J1 over the first and second auxiliary members 30, 31, to solve the shortage of metal at the butted portion J1.

Further, in the joining step, the start end is overlapped with the stop end in the plasticized region W, to increase water tightness and air tightness. Still further, the metal member 20 is joined continuously along the circumferential direction, to increase joining strength.

Still further, in the present embodiment, the four second auxiliary members 31 are arranged at four corners of the metal member 20, to arrange the auxiliary members on the entire circumference of the butted portion J1. This allows for carrying out friction stirring to the entire butted portion J1 in a well-balanced manner. It should be noted that, in the present embodiment, though the first and second auxiliary members 30, 31 are separated, an auxiliary member in a rectangular frame shape may be used in which the auxiliary members 30, 31 are integrally formed.

Yet further, in the joining step according to the sixth and seventh embodiments, the start position S1 for friction stirring is set on the upper face 10a of the metal member 10, but may be set on the butted portion J1 as a position where the primary joining rotary tool F is inserted.

Eight Embodiment

Next, a description will be given of a friction stir welding method according to an eighth embodiment of the present invention. The friction stir welding method according to the present embodiment differs from the sixth embodiment in that a cylindrical metal member is joined. The friction stir welding method according to the eighth embodiment will be described, focusing on portions different from the sixth embodiment.

Figure 19A:
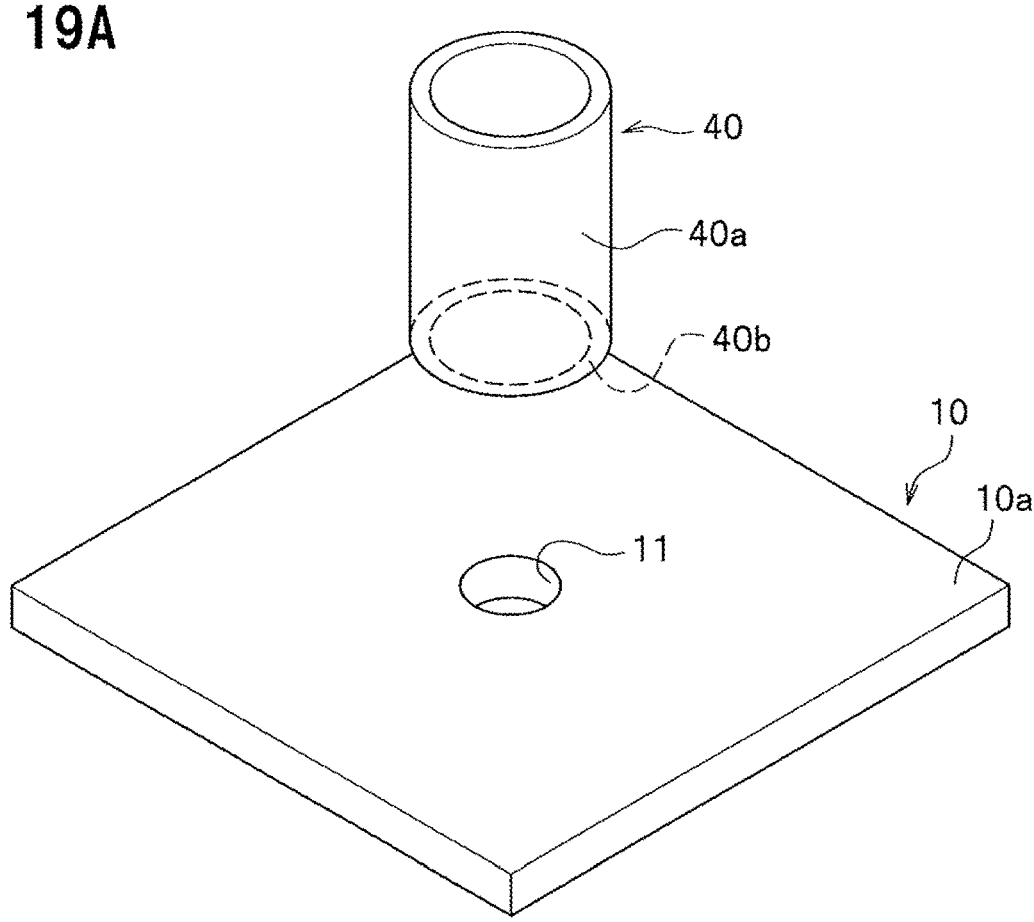
FIG. 19A is a perspective view showing metal members prior to butting and FIG. 19B is a perspective view showing the metal members after the butting, according to an eighth embodiment.

The friction stir welding method according to the present embodiment includes: a butting step, a buildup welding step and a joining step. As shown in FIG. 19A, in the friction stir welding method according to the present embodiment, the metal member 10 is joined with a metal member 40.

The metal member 10 has a rectangular parallelepiped shape (plate shape). A through hole 11 to penetrate the metal member 10 in the plate thickness direction is formed at the center of the metal member 10. The shape of the through hole 11 is not particularly limited, and, in the present embodiment, the through hole 11 has a cylindrical shape in plan view. It should be noted that the through hole 11 may not be necessarily formed.

The metal member 40 has a cylindrical shape. The inner diameter of the metal member 40 is larger than the inner diameter of the through hole 11. Both the metal members 10 and 40 are formed of metal that can be frictionally stirred. In the present embodiment, the metal members 10, 40 are formed of the same material.

Figure 19B:
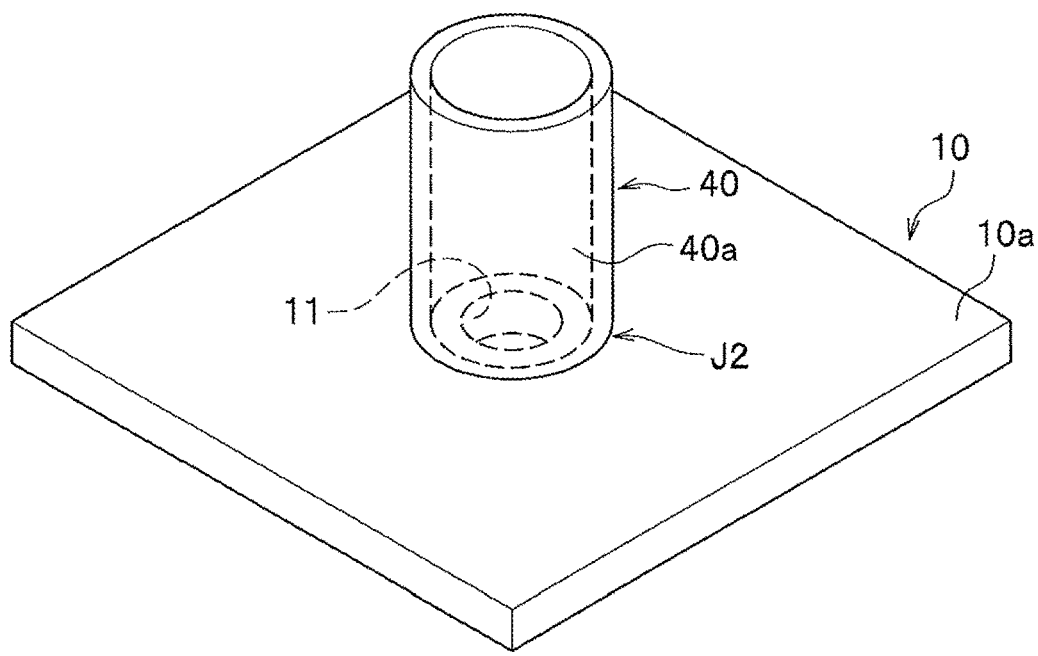

The metal member 10, 40 are butted to each other in the butting step. As shown in FIG. 19B, in the butting step, an end face 40b of the metal member 40 is butted on the upper face 10a of the metal member 10. In the butting step, a hollow portion of the metal member 40 is butted on the through hole 11 so as to communicate with each other. The metal members 10, 40 have faces (upper face 10a, end face 40b) to be butted having shapes different from each other, which forms an inner corner due to the butting and the margin of the upper face 10a of the metal member 10 is in an exposed state. The inner corner is formed by the upper face 10a of the metal member 10 and an outer circumferential face 40a of the metal member 40. The inner corner is formed around the metal member 40 in the entire circumferential direction.

Figure 20A:
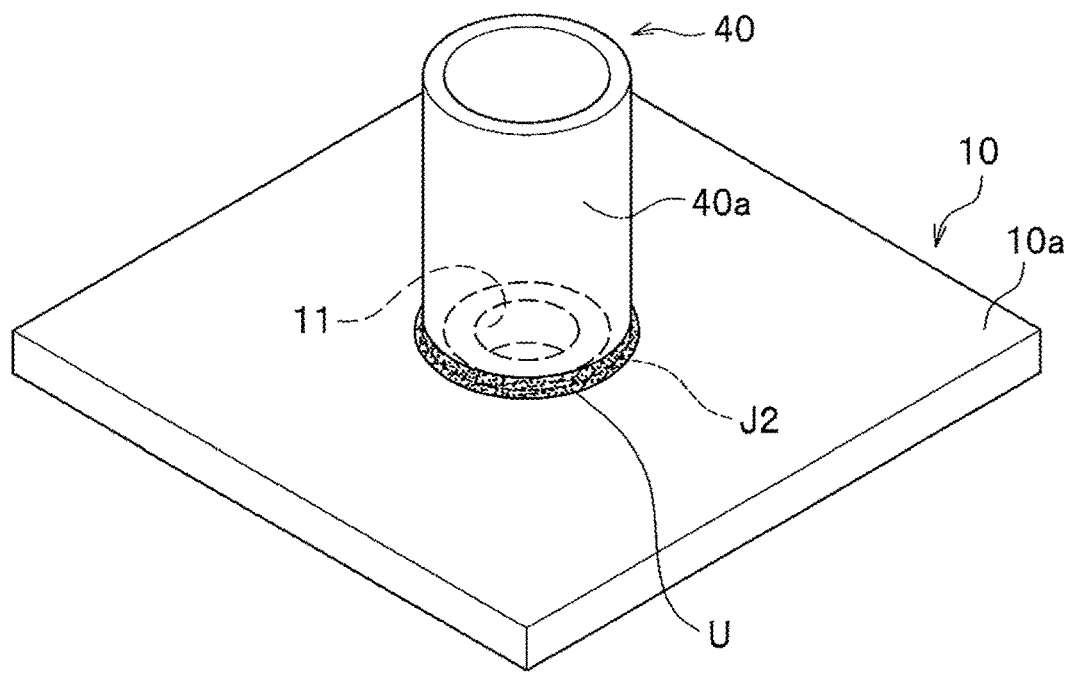
FIG. 20A is a perspective view showing a buildup welding step and FIG. 20B is a perspective view showing a joining step, according to the eighth embodiment.

A butted portion J2 is applied with buildup welding along the circumferential direction of the metal member 40 in the buildup welding step. As shown in FIG. 20A, in the buildup welding step, buildup welding such as the TIG welding or the MIG welding is applied along the entire circumference of the butted portion J2. With the buildup welding step, the entire circumference of the inner corner is covered by the weld metal U. The buildup amount of the weld metal U is preferably set to an extent that, after the joining step, a groove is not formed on the face of the plasticized region W (joined portion) or the weld metal U does not protrude from the face.

Figure 20B:
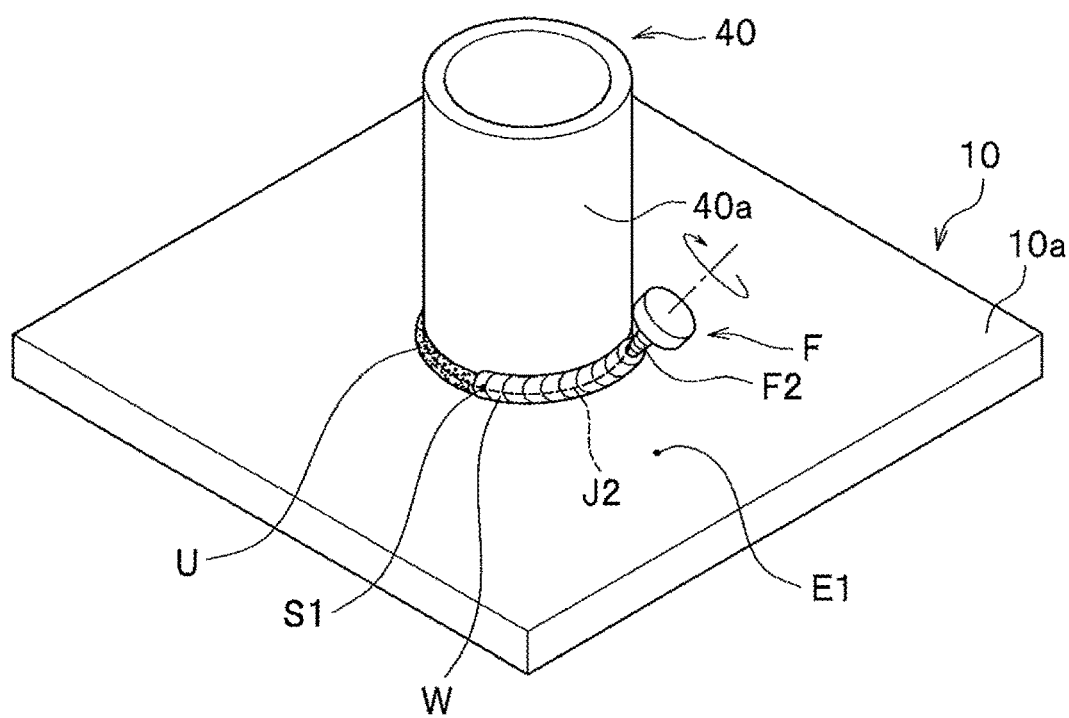

The stirring pin F2 is inserted in the inner corner via the weld metal U to carry out friction stirring along the circumferential direction of the metal member 40 in the joining step. As shown in FIG. 20B, in the joining step, the butted portion J2 is applied with friction stirring by the primary joining rotary tool F. First, the primary joining rotary tool F rotating clockwise is inserted in the start position S1 which is set on the butted portion J2.

Then, the primary joining rotary tool F is operated around the metal member 40 along the butted portion J2. In other words, in the joining step, friction stirring is applied so as to trace the weld metal U. In the joining step, friction stirring is applied in a condition where only the stirring pin F2 is brought into contact with the metal members 10, 40 and the weld metal U. That is, friction stirring is applied in a condition where the base end of the stirring pin F2 is exposed. An insertion angle of the stirring pin F2 may be set appropriately, and, in the present embodiment, the rotation center axis of the primary joining rotary tool F is inclined at an angle of 45 degrees with respect to the vertical plane.

At the time of friction stirring, the primary joining rotary tool F may be moved around the metal member 40, but, in the present invention, the primary joining rotary tool F is fixed and the metal members 10, 40 are rotated around the axis in the vertical direction. Along the movement path of the primary joining rotary tool F, the plasticized region W is formed.

Figure 21:
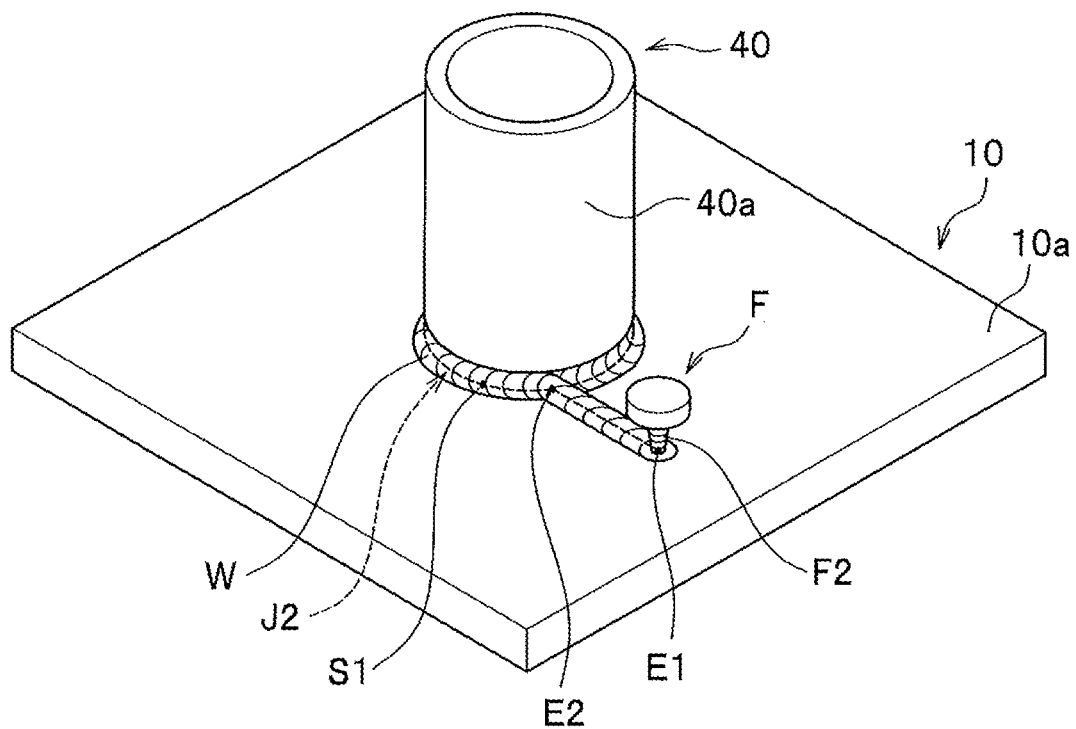
FIG. 21 is a perspective view showing the joining step according to the eighth embodiment.

As shown in FIG. 21, the primary joining rotary tool F is operated around the metal member 40 through the start position S1 and reaches the stop point E2 which is set on the butted portion J1, the primary joining rotary tool F is relatively moved toward the upper face 10a. Then, the primary joining rotary tool F is disengaged at the end position E1 which is set on the upper face 10a.

Once the primary joining rotary tool F is disengaged from the upper face 10a, a through hole of the stirring pin F2 remains on the upper face 10a. For example, a repairing step may be applied to repair the through hole, for example, by buildup welding or the like on the through hole.

The friction stir welding method according to the eighth embodiment described above can achieve approximately the same effects as those of the sixth embodiment.

Ninth Embodiment

Figure 22A:
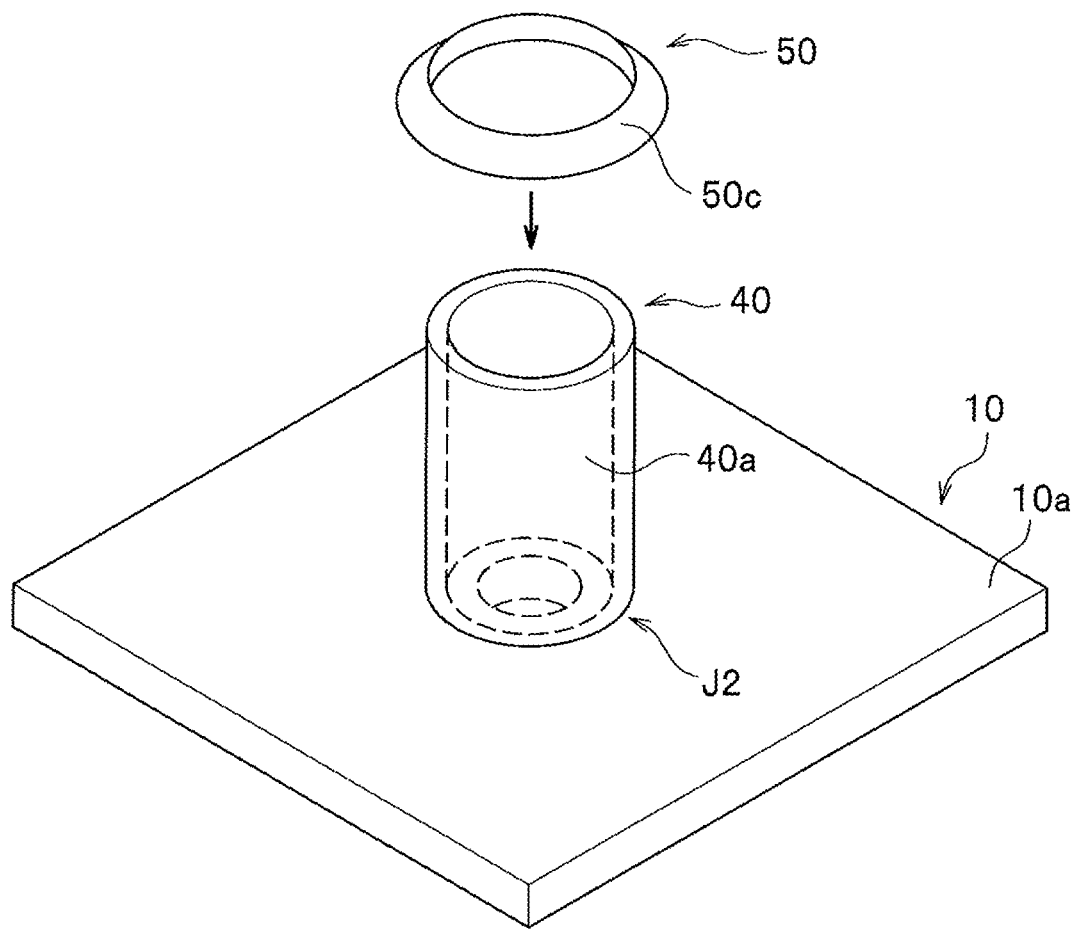
FIG. 22A is a perspective view and FIG. 22B is a cross-sectional view showing an auxiliary member arranging step according to a ninth embodiment.
Figure 22B:
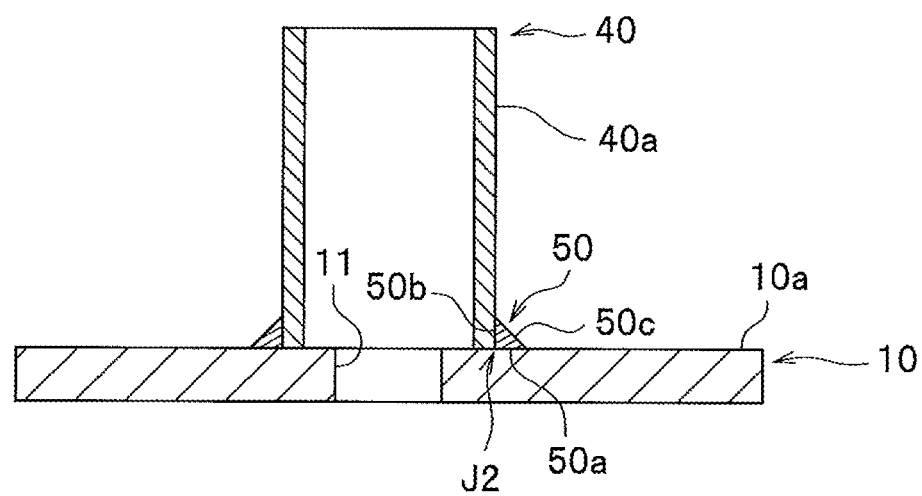

Next, a description will be given of a friction stir welding method according to a ninth embodiment of the present invention. As shown in FIGS. 22A and 22B, the friction stir welding method according to the present embodiment differs from the eighth embodiment in that an auxiliary member 50 is arranged on the butted portion J2. The friction stir welding method according to the ninth embodiment will be described, focusing on portions different from the eighth embodiment.

The friction stir welding method according to the present embodiment includes a butting step, an auxiliary member arranging step and a joining step. The butting step is applied in the same manner as that in the eighth embodiment.

The auxiliary member 50 is arranged on the butted portion J2 along the circumferential direction of the metal member 40 in the auxiliary member arranging step. As shown in FIG. 22A, the auxiliary member 50 has an annular shape a right-angled triangle shape in a cross-section. The inner diameter of the auxiliary member 50 is approximately the same as the outer diameter of the metal member 40. In the auxiliary member arranging step, the auxiliary member 50 is inserted from an end side of the metal member 40. Then, as shown in FIG. 22B, a bottom face 50a of the auxiliary member 50 is in surface contact with the upper face 10a of the metal member 10, and a rising face 50b of the auxiliary member 50 is in surface contact with the outer circumferential face 40a of the metal member 40. Thus, the circumference of the inner corner (butted portion J2) is covered by the auxiliary member 50.

The auxiliary member 50 can be a metal which can be frictionally stirred, and is preferably formed of the same material as the metal members 10, 40 as in the present embodiment.

The stirring pin is inserted in the inner corner via the auxiliary member 50 to carry out friction stirring along the circumferential direction of the metal member 40 in the joining step. Though not shown specifically, in the joining step, the butted portion J2 is applied with friction stirring by the primary joining rotary tool F. First of all, the primary joining rotary tool F rotating clockwise is inserted in the start position which is set on the inclined face 50c of the auxiliary member 50. Then, friction stirring is applied in a condition where only the stirring pin F2 is in contact with the metal members 10, 40 and the auxiliary member 50.

After the primary joining rotary tool F is operated around the metal member 40 to overlap the plasticized region, the primary joining rotary tool F is relatively moved toward the upper face 10a at the stop point which is set on the butted portion J2. Then, the primary joining rotary tool F is disengaged at the end position set on the upper face 10a.

The friction stir welding method according to the ninth embodiment described above can achieve approximately the same effects as those of the seventh embodiment. Further, the auxiliary member 50 has a circular ring shape, to facilitate applying the auxiliary member arranging step.

It should be noted that the eighth and ninth embodiments use the cylindrical metal member 40, but may use a columnar or plate metal member instead. In a case where the columnar or plate metal member is butted on the metal member 10 shown in FIG. 19A, the through hole 11 is covered by the metal member. In addition, a tubular metal member having other planar shape may be used instead of the cylindrical metal member 40.

Tenth Embodiment

Next, a description will be given of a friction stir welding method according to a tenth embodiment of the present invention. The friction stir welding method according to the present embodiment includes: a butting step; a buildup welding step; and a joining step.

Figure 23A:
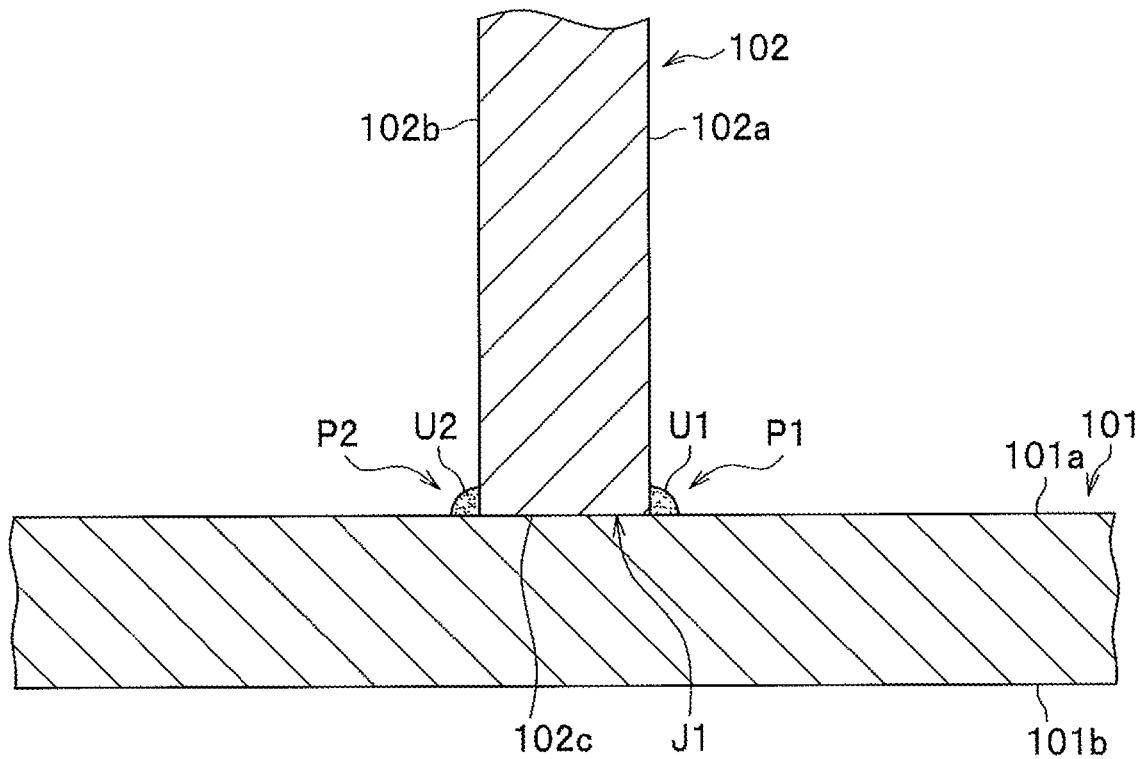
FIG. 23A is a cross-sectional view showing a butting step and a buildup welding step.
Figure 23B:
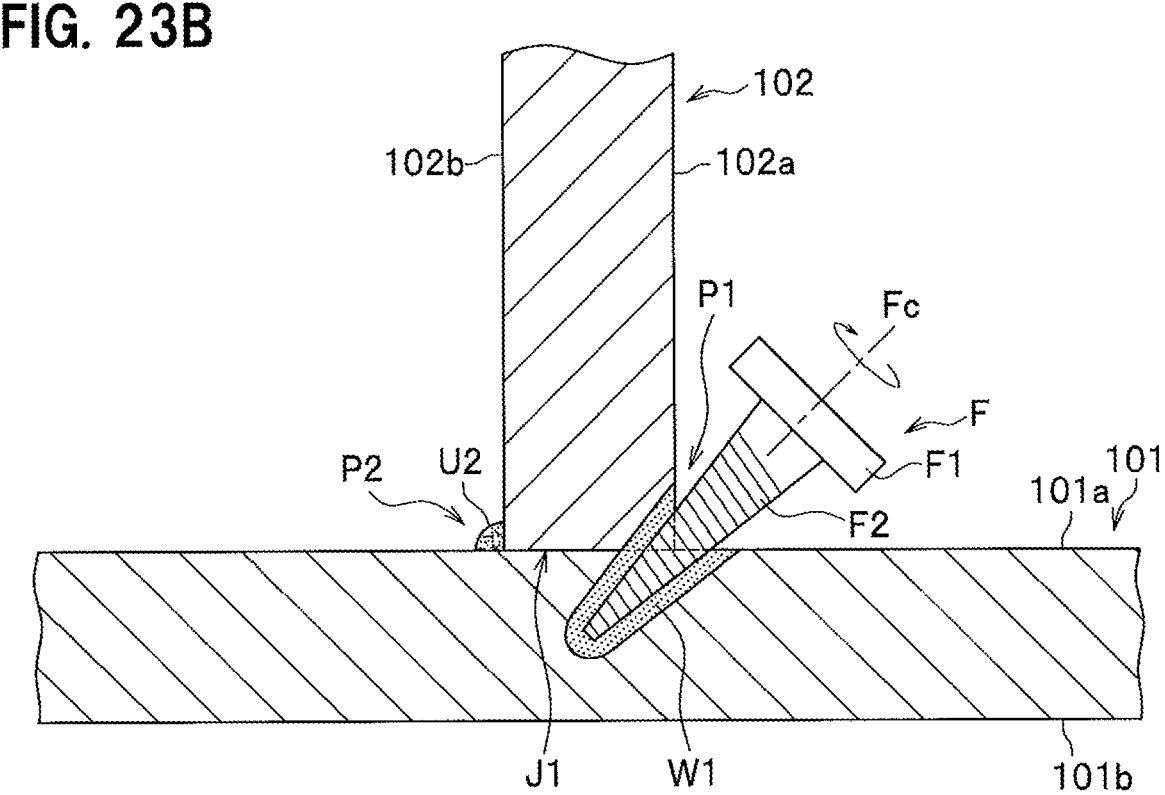
FIG. 23B is a cross-sectional view showing a first joining step, according to a tenth embodiment.

As shown in FIGS. 23A and 23B, in the present embodiment, the butted portion J1 formed by metal members 101, 102 butted with each other is joined by friction stirring. The metal members 101, 102 are made of metal and have a rectangular parallelepiped shape (plate shape). The metal members 101, 102 are formed of the same material. The material of the metal members 101, 102 is not particularly limited as long as metal which can be frictionally stirred, and may be suitably selected from aluminum, aluminum alloy, copper, copper alloy, titanium, titanium alloy, magnesium, magnesium alloy or the like.

The butted portion J1 is formed by the metal members 101, 102 that are butted with each other in the butting step. As shown in FIG. 23A, in the butting step, an end face 102c of the metal member 102 is butted on the center of a side face 101a of the metal member 101 to form the butted portion J1. A joined metal member made up of the metal members 101, 102 is formed by the butting step. The joined metal member has a T-shape in front view. A first inner corner P1 and a second inner corner P2 are formed on both sides of the metal member 102. The first inner corner P1 is constituted by the side face 101a of the metal member 101 and a side face 102a of the metal member 102. The second inner corner P2 is constituted by the side face 101a of the metal member 101 and a side face 102b of the metal member 102.

Buildup welding is carried out on the butted portion J1 in the buildup welding step. As shown in FIG. 23A, in the buildup welding step, buildup welding such as the TIG welding or the MIG welding is applied along an extending direction of the first and second inner corners P1, P2. With the buildup welding step, the first and second inner corners P1, P2 are covered by weld metals U1, U2, respectively. The buildup amount of the weld metals U1, U2 are preferably set to an extent that, after the joining step, grooves are not formed on the faces of the plasticized regions W1, W2 (joined portions) or the weld metals U1, U2 do not protrude from the faces.

Figure 24:
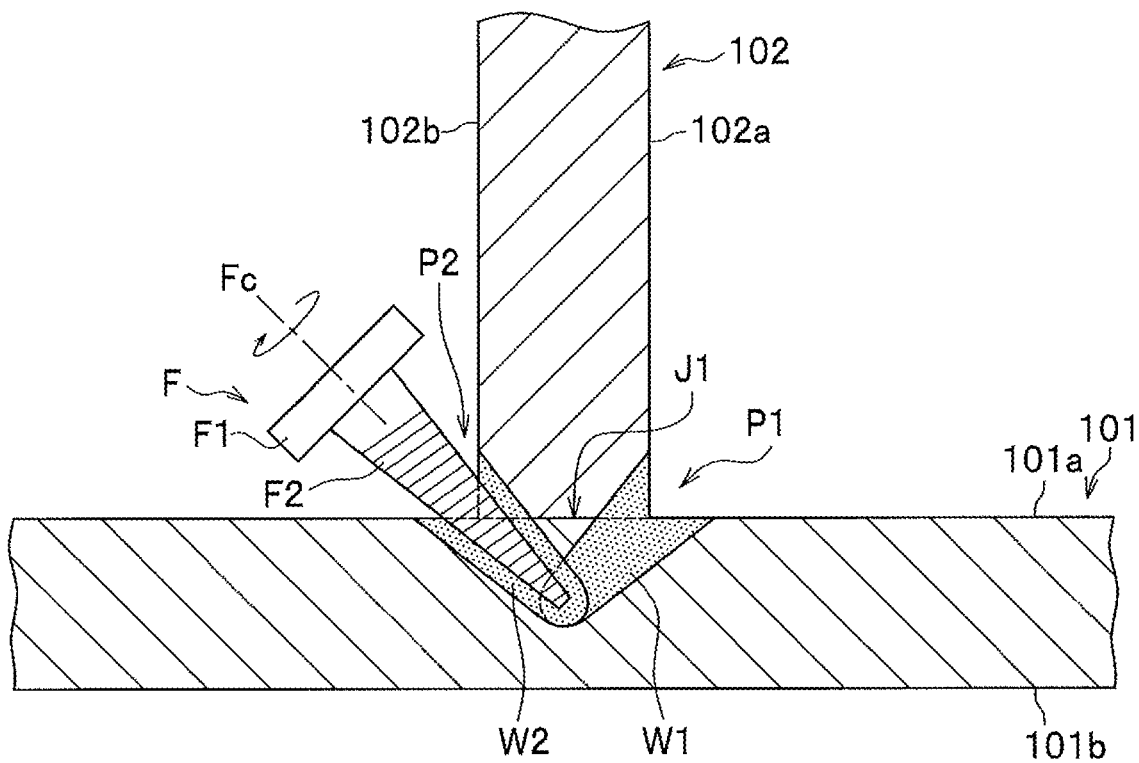
FIG. 24 is a cross-sectional view showing a second joining step according to the tenth embodiment.

The butted portion J1 is applied with friction stirring by the primary joining rotary tool F in the joining step. As shown in FIGS. 23B and 24, the joining step includes, in the present embodiment, a first joining step for friction stirring along the first inner corner P1 and a second joining step for friction stirring along the second inner corner P2.

In the first joining step, the primary joining rotary tool F rotating clockwise is inserted in the first inner corner P1 so as to trace the weld metal U1 for friction stirring. As shown in FIG. 23B, in the first joining step, friction stirring is applied in a condition where only the stirring pin F2 is in contact with the metal members 101, 102 and the weld metal U1. In other words, friction stirring is applied in a condition where the base end of the stirring pin F2 is exposed. Along the movement path of the primary joining rotary tool F, the plasticized region W1 is formed. An insertion angle of the stirring pin F2 may be set as appropriate, and, in the present embodiment, the rotation center axis of the primary joining rotary tool F is inclined at an angle of 45 degrees with respect to the vertical plane.

In the second joining step, the primary joining rotary tool F rotating clockwise is inserted in the second inner corner P2 so as to trace the weld metal U2 (see FIG. 23A) for friction stirring. As shown in FIG. 24, in the second joining step, friction stirring is applied in a condition where only the stirring pin F2 is in contact with the metal members 101, 102 and the weld metal U2. In other words, friction stirring is applied in a condition where the base end of the stirring pin F2 is exposed. Along the movement path of the primary joining rotary tool F, the plasticized region W2 is formed. An insertion angle of the stirring pin F2 may be set as appropriate, and, in the present embodiment, the rotation center axis of the primary joining rotary tool F is inclined at an angle of 45 degrees with respect to the vertical plane.

In the second joining step, the stirring pin F2 is preferably inserted to an extent that at least the plasticized region W2 is brought in contact with the plasticized region W1, and, in this embodiment, the tip of the stirring pin F2 is set to be inserted into the plasticized region W1.

According to the friction stir welding method described above, the first and second inner corners P1, P2 are applied with buildup welding in advance to carry out friction stirring to the butted portion J1 from above the weld metals U1, U2, to solve the shortage of metal in the first and second inner corners P1, P2.

Further, in the present embodiment, the two inner corners (first inner corner P1 and second inner corner P2) are applied with buildup welding, to enhance joining strength of the joined metal members. Accordingly, the joining step can be done in a stable manner.

Still further, in the present embodiment, the two inner corners (first inner corner P1 and second inner corner P2) are applied with friction stirring, to increase joining strength in addition to air tightness and water tightness of the joined portion. Though a joining defect may occur in the plasticized region W1 formed in the first joining step, the stirring pin F2 is inserted into the plasticized region W1 for friction stirring as in the present embodiment, to repair the joining defect. This allows for increasing water tightness and air tightness more.

It should be noted that, in the buildup welding step, both the first and second inner corners P1, P2 are applied with buildup welding in the present embodiment, but either one of them may be applied with buildup welding.

Eleventh Embodiment

Next, a description will be given of a friction stir welding method according to an eleventh embodiment of the present invention. The friction stir welding method according to the present embodiment differs from the tenth embodiment in that a first auxiliary member 7 and a second auxiliary member 8 are respectively arranged on the first inner corner P1 and the second inner corner P2. The friction stir welding method according to the eleventh embodiment will be described, focusing on portions different from the tenth embodiment.

Figure 25:
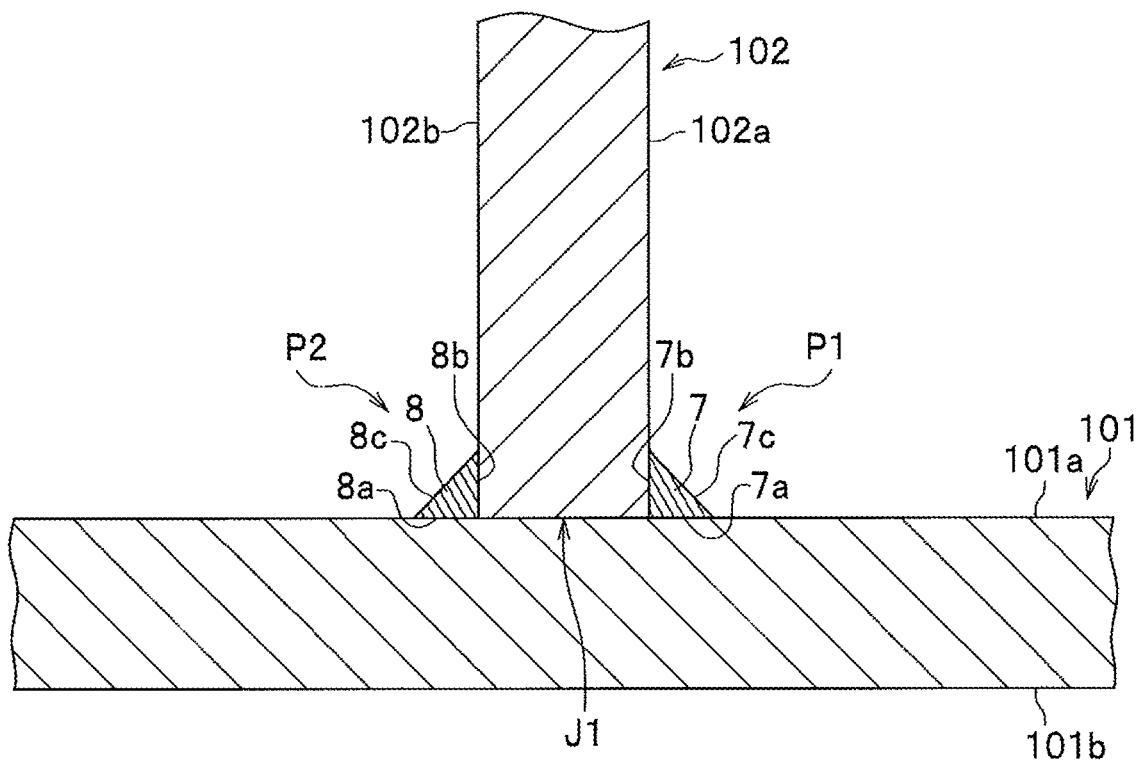
FIG. 25 is a cross-sectional view showing a butting step and an auxiliary member arranging step, according to an eleventh embodiment.

The friction stir welding method according to the present embodiment includes: a butting step; an auxiliary member arranging step; a tab member arranging step; and a joining step. As shown in FIG. 25, the butting step is applied in the same manner as that in the tenth embodiment.

The first auxiliary member (auxiliary member) 7 and second auxiliary member (auxiliary member) 8 are arranged on the butted portion J1 in the auxiliary member arranging step. The first and second auxiliary members 7, 8 are made of metal and have a triangular prism shape. The first and second auxiliary members 7, 8 are formed in the same shape. The first and second auxiliary members 7, 8 may be made of metal that can be frictionally stirred, and are preferably formed of the same material as that of the metal members 101, 102 as in the present embodiment.

The first and second auxiliary members 7, 8 have an isosceles right triangle shape in cross-section. The first and second auxiliary members 7, 8 are as long as the butted portion J1. As shown in FIG. 25, in the auxiliary member arranging step, a bottom face 7a of the first auxiliary member 7 is in surface contact with the side face 101a of the metal member 101, and a rising face 7b of the first auxiliary member 7 is in surface contact with the side face 102a of the metal member 102. This causes the first inner corner P1 to be covered by the first auxiliary member 7.

Further, in the auxiliary member arranging step, a bottom face 8a of the second auxiliary member 8 is in surface contact with the side face 101a of the metal member 101, and a rising face 8b of the second auxiliary member 8 is in surface contact with the side face 102b of the metal member 102. This causes the second inner corner P2 to be covered by the second auxiliary member 8.

The size of the first and second auxiliary members 7, 8 are preferably set to an extent that, after the joining step, grooves are not formed on the faces of the plasticized regions W1, W2 (joined portions), and each auxiliary member does not remain on each face.

Figure 26:
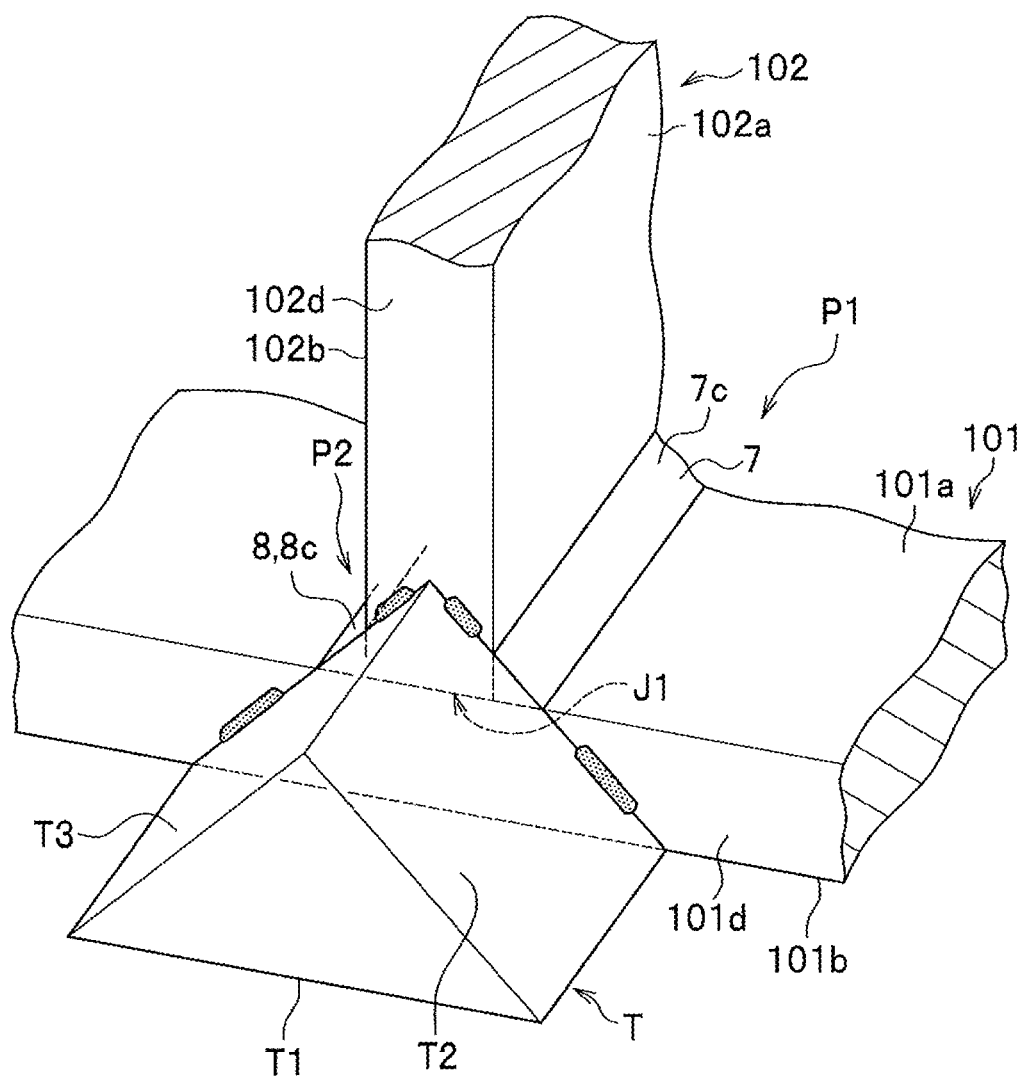
FIG. 26 is a perspective view showing a tab member arranging step according to the eleventh embodiment.

A tab member T is arranged on a front face of the joined metal member in the tab member arranging step. As shown in FIG. 26, the tab member T is formed of the same metal as the metal members 101, 102 and has a triangular prism shape. The cross-section of the tab member T has an isosceles right triangle shape. The tab member T includes a bottom face T1 and inclined faces T2, T3.

In the tab member arranging step, the bottom face T1 of the tab member T is made flush with the side face 101b of the metal member 101, and an end face of the tab member T is made in surface contact with the front face of the joined metal member (a front face 101d of the metal member 101 and a front face 102d of the metal member 102). Then, the tab member T is provisionally joined to the joined metal members by welding. The inclined face T2 (tool insertion face) of the tab member T is made flush with the inclined face 7c (exposed face) of the first auxiliary member 7 by the tab member arranging step. Further, the inclined face T3 (tool insertion face) of the tab member T is made flush with the inclined face 8c (exposed face) of the second auxiliary member 8.

Figure 27:
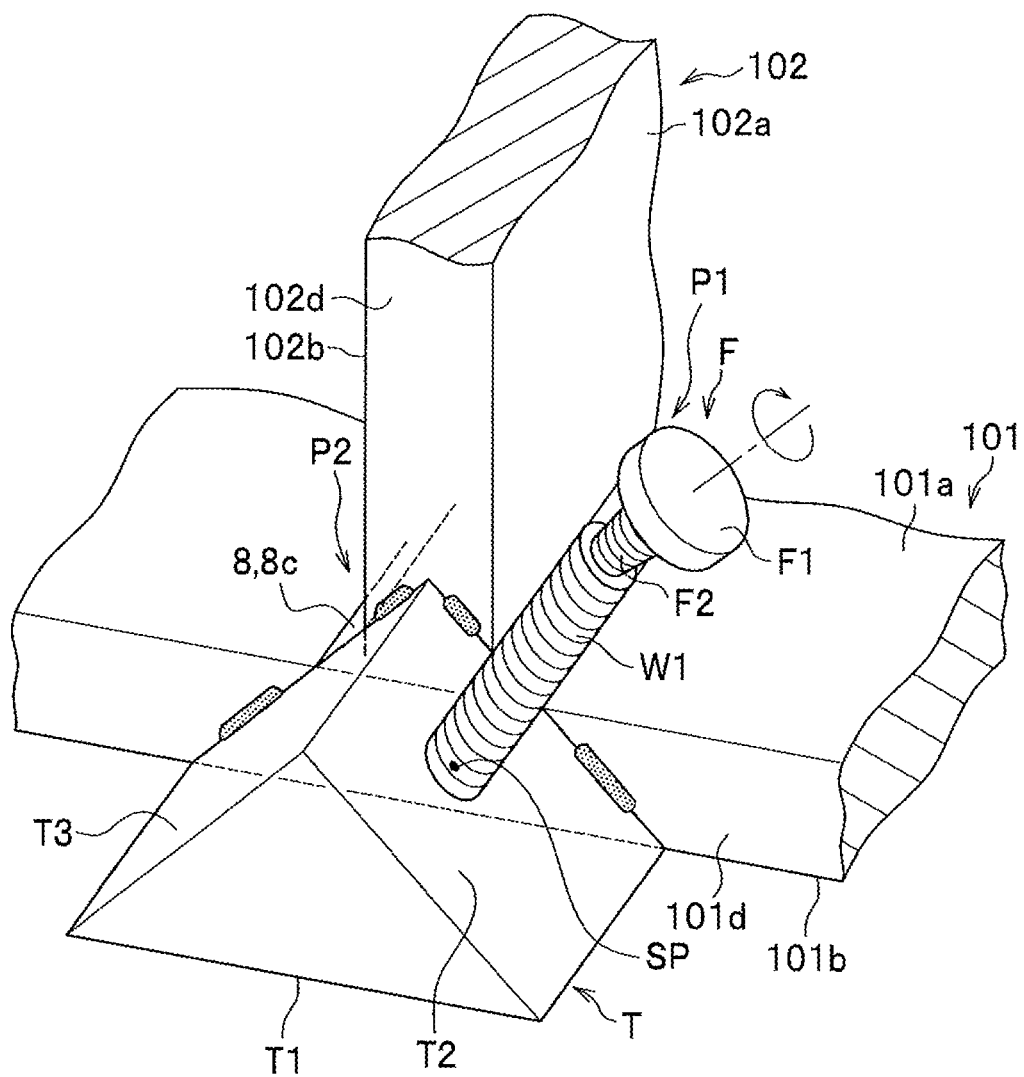
FIG. 27 is a perspective view showing a first joining step according to the eleventh embodiment.
Figure 28:
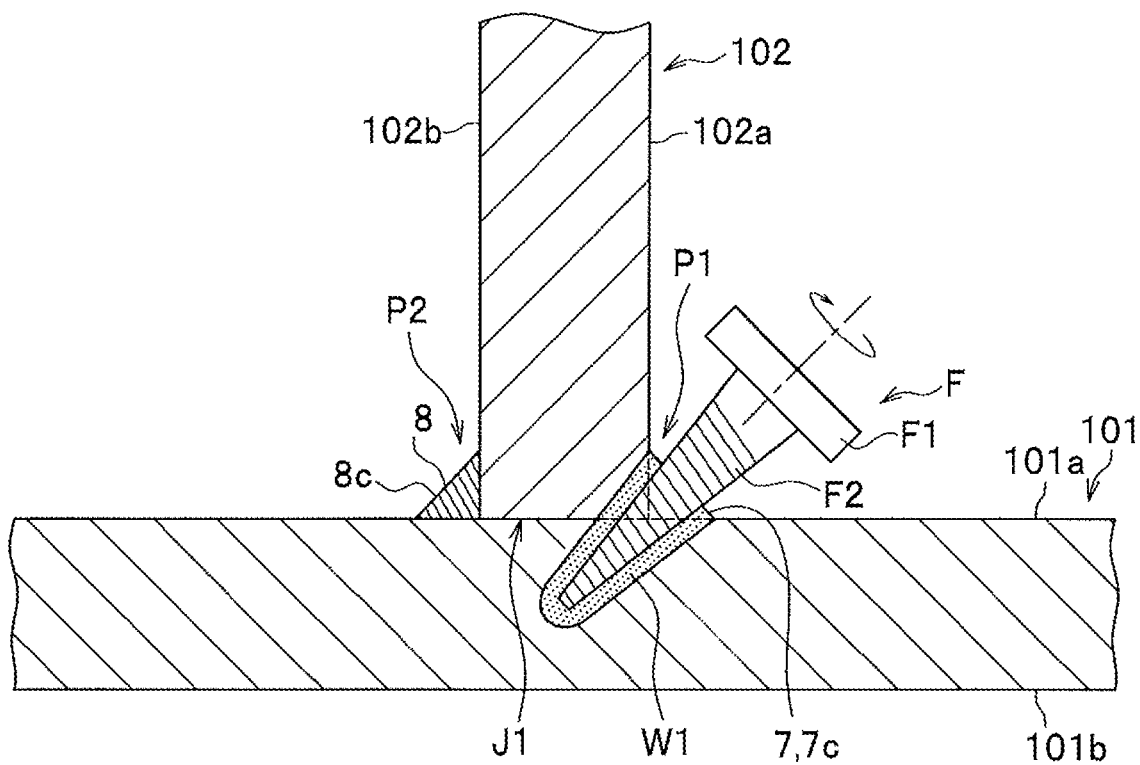
FIG. 28 is a cross-sectional view showing the first joining step according to the eleventh embodiment.

The butted portion J1 is applied with friction stirring by the primary joining rotary tool F in the joining step. As shown in FIGS. 27 and 28, in the present embodiment, the joining step includes a first joining step for friction stirring along the first inner corner P1 and a second joining step for friction stirring along the second inner corner P2.

In the first joining step, the primary joining rotary tool F rotating clockwise is first inserted in a start position SP which is set on the inclined face T2 of the tab member T. In the present embodiment, the primary joining rotary tool F is inserted in the inclined face T2 such that the rotation center axis of the primary joining rotary tool F is perpendicular to the inclined face T2. Then, the primary joining rotary tool F is relatively moved toward the joined metal members.

After the primary joining rotary tool F reaches the first auxiliary member 7, the butted portion J1 is applied with friction stirring so as to continuously trace the inclined face 7c. In other words, the primary joining rotary tool F is relatively moved in depth from the front faces of the joined metal members (front face 101d of the metal member 101 and front face 102d of the metal member 102). As shown in FIG. 28, in the first joining step, friction stirring is applied in a condition where only the stirring pin F2 is in contact with the metal members 101, 102 and the first auxiliary member 7. In other words, friction stirring is applied in a condition that the base end of the stirring pin F2 is exposed. Along the movement path of the primary joining rotary tool F, the plasticized region W1 is formed. An insertion angle of the stirring pin F2 may be set appropriately, and, in the present embodiment, the rotation center axis of the primary joining rotary tool F is inclined at an angle of 45 degrees with respect to the vertical plane. In other words, friction stirring is applied in a condition where the rotation center axis of the primary joining rotary tool F is set perpendicular to the inclined face 7c.

In the second joining step, as shown in FIG. 27, the primary joining rotary tool F rotating clockwise is first inserted in a start position which is set on the inclined face T3 of the tab member T. In the present embodiment, the primary joining rotary tool F is inserted in the inclined face T3 such that the rotation center axis of the primary joining rotary tool F is perpendicular to the inclined face T3. Then, the primary joining rotary tool F is relatively moved toward the joined metal members.

Figure 29:
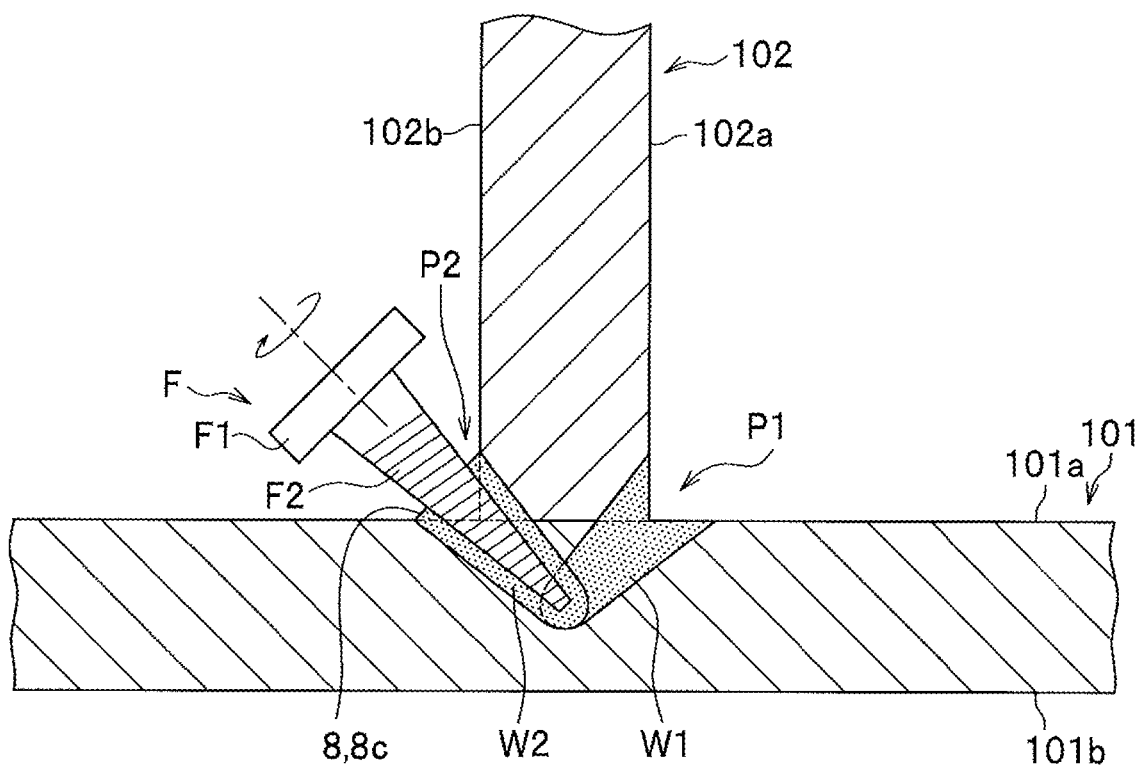
FIG. 29 is a cross-sectional view showing a second joining step according to the eleventh embodiment.

After the primary joining rotary tool F reaches the second auxiliary member 8, the butted portion J1 is applied with friction stirring so as to continuously trace the inclined face 8c. As shown in FIG. 29, in the second joining step, friction stirring is applied in a condition where only the stirring pin F2 is in contact with the metal members 101, 102 and the second auxiliary member 8. In other words, friction stirring is applied in a condition where the base end of the stirring pin F2 is exposed. Along the movement path of the primary joining rotary tool F, the plasticized region W2 is formed. An insertion angle of the stirring pin F2 may be set appropriately, and, in the present embodiment, the rotation center axis of the primary joining rotary tool F is inclined at an angle of 45 degrees with respect to the vertical plane. In other words, friction stirring is applied in a condition where the rotation center axis of the primary joining rotary tool F is set perpendicular to the inclined face 8c.

In the second joining step, the stirring pin F2 is preferably inserted to an extent that at least the plasticized region W2 is brought in contact with the plasticized region W1, and, in this embodiment, the tip of the stirring pin F2 is set to be inserted into the plasticized region W1. After the joining step, the tab member T is removed from the joined metal members.

According to the friction stir welding method described above, the first auxiliary member 7 and second auxiliary member 8 are arranged at the first inner corner P1 and second inner corner P2 in advance, respectively, to carry out friction stirring to the butted portion J1 from above the first auxiliary member 7 and second auxiliary member 8, to solve the shortage of metal in the first inner corner P1 and second inner corner P2.

Further, in the present embodiment, the two inner corners (first inner corner P1 and second inner corner P2) are applied with friction stirring, to increase joining strength in addition to air tightness and water tightness of the joined portion. Still further, though a joining defect may occur in the plasticized region W1 formed in the first joining step, the stirring pin F2 can be inserted into the plasticized region W1 for friction stirring further as in the present embodiment, to repair the joining defect. This allows for increasing water tightness and air tightness.

Further, the tab member T is arranged to allow the start position (insertion position) of the primary joining rotary tool F in the joining step to be set on the tab member T. Still further, the start positions (insertion positions) for the first and second joining steps can be set on one tab member T, to improve work efficiency. Yet further, the inclined face (tool insertion face) T2 of the tab member T is set to be flush with the inclined face (exposed face) 7c of the first auxiliary member 7 and the inclined face (tool insertion face) T3 of the tab member T is set to be flush with the inclined face (exposed face) 8c of the second auxiliary member 8, to allow for carrying out the joining step smoothly.

It should be noted that, in the present embodiment, since the first and second auxiliary members 7, 8 have a triangular prisms shape, the faces in which the stirring pin F2 is inserted, that is, the exposed faces that are exposed at the inner corners are inclined faces 7c, 8c, but the present invention is not limited thereto. The faces (exposed faces) of the first and second auxiliary members in which the stirring pin F2 is inserted may be curved faces. In this case, the shapes of the tool insertion faces of the tab member T are preferably changed so as to be flush with the curved faces. This allows for carrying out the joining step smoothly.

Moreover, also in the tenth embodiment, the joining step may be applied using the tab member. Also in this case, respective tool insertion faces of the tab member T are preferably set to be approximately flush with the exposed faces of the weld metals U1, U2.

EXPLANATION OF REFERENCES

1: metal member 1a: end face 1b: side face 1c: side face 1d: side face 2: metal member 2a: end face 2b: side face 2c: side face 2d: side face 3: tab member 4: tab member 7: first auxiliary member (auxiliary member) 8: second auxiliary member (auxiliary member) 9: auxiliary member 10: metal member 20: metal member 30: first auxiliary member (auxiliary member) 31: second auxiliary member (auxiliary member) 40: metal member 50: auxiliary member C: imaginary reference plane C1: intersection line F: primary joining rotary tool F1: coupling portion F2: stirring pin G: large rotary tool H: small rotary tool M: weld metal U1: weld metal U2: weld metal J1: butted portion J2: butted portion T: tab member W: plasticized region W1 to W4: plasticized region

The invention claimed is:

1. A friction stir welding method for joining two metal members by a rotary tool having a coupling portion to be coupled to a rotary shaft of a friction stirring apparatus and a stirring pin extending downward from, coaxial with, and tapering off with increasing distance from the coupling portion, comprising steps of:
  butting in which the two metal members are butted with each other at an angle to form a butted portion;
  auxiliary member arranging in which an auxiliary member is arranged along an inner corner of the two metal members formed in the butting step, wherein the auxiliary member is metal and is separate from the two metal members, and wherein a width of the auxiliary member is larger than a diameter of a tip of the stirring pin and smaller than a diameter of the coupling portion; and
  inner corner joining in which only the stirring pin in rotation is inserted in the auxiliary member and the inner corner to carry out friction stirring in the butted portion to make an integrated plasticized region made from the two metal members and the auxiliary member through plasticization of the two metal members and the auxiliary member while only the stirring pin is in contact with the auxiliary member and the two metal members.

2. The friction stir welding method according to claim 1 further comprising a step of outer corner joining in which the butted portion is applied with friction stir welding along an outer corner side of the metal members.

3. The friction stir welding method according to claim 2, wherein a plasticized region formed in the outer corner joining step is overlapped with a plasticized region formed in the inner corner joining step.

4. The friction stir welding method according to claim 1 further comprising a step of outer corner joining in which the butted portion is applied with welding along an outer corner of the metal members.

5. The friction stir welding method according to claim 4, wherein a weld metal formed in the outer corner welding step is overlapped with a plasticized region formed in the inner corner welding step.

6. The friction stir welding method according to claim 1, wherein, in the butting step, a side face of one of the metal members is butted with an end face of the other of the metal members, and in a case where an inner corner has an angle α formed by the side face of one of the metal members and a side face of the other of the metal members,
  in the inner corner welding step, a rotation center axis of the rotary tool inserted through an intersection line of the side faces is positioned between the side face of one of the metal members and an imaginary reference plane that runs through the intersection line and has an angle of α/2 with respect to the side faces.

7. A friction stir welding method for joining two metal members having faces in different shapes to be butted by a rotary tool having a coupling portion to be coupled to a rotary shaft of a friction stirring apparatus and a stirring pin extending downward from, coaxial with, and tapering off with increasing distance from the coupling portion, comprising steps of:
  butting in which one of the two metal members is butted with the other of the metal members to form a butted portion;

auxiliary member arranging in which an auxiliary member is arranged on the butted portion along a circumferential direction of the other of the metal members to cover an inner corner of the metal members by the auxiliary member, wherein the auxiliary member is metal and is separate from the two metal members, and wherein a width of the auxiliary member is larger than a diameter of a tip of the stirring pin and smaller than a diameter of the coupling portion; and inner corner joining in which only the stirring pin in rotation is inserted in the auxiliary member and the inner corner to carry out friction stirring in the butted portion along the circumferential direction of the other of the metal members to make an integrated plasticized region made from the two metal members and the auxiliary member while only the stirring pin is in contact with the auxiliary member and the two metal members.

8. The friction stir welding method according to claim 7, wherein the metal members have a plate shape, and an upper face of one of the metal members is butted with a lower face of the other of the metal members in the butting step.

9. The friction stir welding method according to claim 7, wherein one of the metal members has a plate shape and the other of the metal members has a columnar shape, and an upper face of one of the metal members is butted with an end face of the other of the metal members in the butting step.

10. The friction stir welding method according to claim 7, wherein one of the metal members has a plate shape and the other of the metal members has a tubular shape, and an upper face of one of the metal members is butted with an end face of the other of the metal members in the butting step.

11. The friction stir welding method according to claim 7, wherein one of the metal members has a plate shape and the other of the metal members has a cylindrical shape, and an upper face of one of the metal members is butted with an end face of the other of the metal members in the butting step.

12. The friction stir welding method according to claim 7, wherein one of the metal members is formed with a through hole, and the other of the metal members covers the through hole in the butting step.

13. The friction stir welding method according to claim 7, wherein one of the metal members is formed with a through hole, and the through hole is made to communicate with a hollow portion of the other of the metal members in the butting step.

14. A friction stir welding method for joining two metal members by a rotary tool having a coupling portion to be coupled to a rotary shaft of a friction stirring apparatus and a stirring pin extending downward from, coaxial with, and tapering off with increasing distance from the coupling portion, comprising steps of:

butting in which a side face of one of the two metal members is butted with an end face of the other of the metal members to form a butted portion for forming a joined metal member having a T-shape in front view;

auxiliary member arranging in which an auxiliary member is arranged on at least one inner corner of the joined metal member to cover the inner corner by the auxiliary member, wherein the auxiliary member is metal and is separate from the two metal members, and wherein a width of the auxiliary member is larger than a diameter of a tip of the stirring pin and smaller than a diameter of the coupling portion; and inner corner joining in which only the stirring pin in rotation is inserted in the auxiliary member and the inner corner to carry out friction stirring in the butted portion to make an integrated plasticized region made from the two metal members and the auxiliary member while only the stirring pin in contact with the auxiliary member and the two metal members.

15. The friction stir welding method according to claim 14, wherein, in the auxiliary member arranging step, two inner corners of the joined metal member are arranged with the auxiliary members respectively to cover each inner corner by the auxiliary member, and the joining step includes steps of first joining in which one of the two inner corners of the joined metal member is applied with friction stirring and second joining in which the other of the inner corners is applied with friction stirring, wherein, in the second joining step, friction stirring is carried out while the stirring pin is inserted into a plasticized region formed in the first joining step.

16. The friction stir welding method according to claim 15 further comprising a step of: tab member arranging in which a tab member having two tool insertion faces is abutted on a front face of the joined metal member after the butting step, wherein, in the tab member arranging step, an exposed face of one of the auxiliary members is made flush with one of the tool insertion face of the tab member, and an exposed face of the other of the auxiliary members is made flush with the other of the tool insertion face of the tab member.

17. The friction stir welding method according to claim 1, wherein the auxiliary member has a triangular prism shape.

18. The friction stir welding method according to claim 1, wherein the auxiliary member is made of the same material as that of the metal members.

19. The friction stir welding method according to claim 1, wherein the auxiliary member is sized such that there is enough metal provided for friction stir welding along the inner corner.

20. The friction stir welding method according to claim 1, wherein the auxiliary member is sized such that a groove is not formed on a face of the metal members or the inner corner.

21. The friction stir welding method according to claim 1, wherein the two metal members are made of an aluminum alloy and the auxiliary member is made of an aluminum alloy.

22. The friction stir welding method according to claim 7, wherein the two metal members are made of an aluminum alloy and the auxiliary member is made of an aluminum alloy.

23. The friction stir welding method according to claim 14, wherein the two metal members are made of an aluminum alloy and the auxiliary member is made of an aluminum alloy.

24. The friction stir welding method according to claim 1, wherein a face of the auxiliary member in which the stirring pin is inserted is a curved face.

25. The friction stir welding method according to claim 7, wherein a face of the auxiliary member in which the stirring pin is inserted is a curved face.

26. The friction stir welding method according to claim 14, wherein a face of the auxiliary member in which the stirring pin is inserted is a curved face.

27. The friction stir welding method according to claim 1, further comprising a step of tab member arranging in which a tab is arranged after the step of butting,
- wherein the tab member has a triangular prism shape,
- wherein in the step of tab member arranging, the tab member is arranged to one end of the butted portion of the two metal members to make a side face of the tab member abut on side faces of the two metal members,
- wherein the auxiliary member has a triangular prism shape,
- wherein in the step of auxiliary member arranging, an inclined face of the triangular prism shape of the auxiliary member is exposed, and
- wherein the inclined face of the auxiliary member is flush with an inclined face of the tab member.

28. The friction stir welding method according to claim 1, wherein a direction of insertion of the stirring pin is angled relative to a reference plane normal to an exposed surface of the auxiliary member.

29. The friction stir welding method according to claim 7, wherein a direction of insertion of the stirring pin is angled relative to a reference plane normal to an exposed surface of the auxiliary member.

30. The friction stir welding method according to claim 14, wherein a direction of insertion of the stirring pin is angled relative to a reference plane normal to an exposed surface of the auxiliary member.

* * * * *